(12) United States Patent
Masuda

(10) Patent No.: US 10,824,005 B2
(45) Date of Patent: Nov. 3, 2020

(54) DISPLAY DEVICE WITH DISPLAY PRESENTING IMAGE BASED ON EXTERNALLY PROVIDED IMAGE DATA AND DOUBLING AS SEE-THROUGH DISPLAY

(71) Applicant: SHARP KABUSHIKI KAISHA, Sakai (JP)

(72) Inventor: Junichi Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/470,352

(22) PCT Filed: Jan. 9, 2018

(86) PCT No.: PCT/JP2018/000165
§ 371 (c)(1),
(2) Date: Jul. 10, 2019

(87) PCT Pub. No.: WO2018/131558
PCT Pub. Date: Jul. 19, 2018

(65) Prior Publication Data
US 2020/0124913 A1    Apr. 23, 2020

(30) Foreign Application Priority Data

Jan. 16, 2017  (JP) .................... 2017-005091

(51) Int. Cl.
*G02F 1/1335*      (2006.01)
*F21V 8/00*        (2006.01)
(Continued)

(52) U.S. Cl.
CPC ...... *G02F 1/133536* (2013.01); *G02B 6/0011* (2013.01); *G02F 1/1396* (2013.01);
(Continued)

(58) Field of Classification Search
CPC ............. G02F 1/133536; G02F 1/1396; G02F 2001/133531; G02F 1/1347; G02F 1/1335;
(Continued)

(56) References Cited

U.S. PATENT DOCUMENTS

2002/0159033 A1   10/2002   van Gelder et al.
2013/0271674 A1   10/2013   Liu et al.
(Continued)

FOREIGN PATENT DOCUMENTS

JP   2005-502070 A   1/2005
WO   2015/053023 A1  4/2015

*Primary Examiner* — Rodney Amadiz
(74) *Attorney, Agent, or Firm* — ScienBiziP, P.C.

(57) ABSTRACT

Provided is a display device enhancing an image contrast ratio and thereby enhancing display quality without being affected by ambient brightness. The luminance of an image displayed on a first liquid crystal panel in a display gradually increases in slope as a gradation value increases from 0 to 255. Accordingly, luminance A for the gradation value 0 is the same as conventional luminance a for the gradation value 0. However, luminance B for the gradation value 255 is higher than conventional luminance 2b for that gradation value, resulting in a high contrast ratio as expressed by the following equation:

$B:A=B/A:1>2b/a:1.$

6 Claims, 21 Drawing Sheets

(51) Int. Cl.
  *G02F 1/139*    (2006.01)
  *G09G 3/36*    (2006.01)
(52) U.S. Cl.
  CPC ......... *G09G 3/3677* (2013.01); *G09G 3/3688* (2013.01); *G02F 2001/133531* (2013.01)
(58) Field of Classification Search
  CPC ......... G02F 1/133; G02F 1/13; G09G 3/3688; G09G 3/3677; G09G 3/3611; G09G 3/36; G09G 3/34; G09G 3/20; G09G 2320/066; G09G 2300/023; G02B 6/0011; G09F 9/46
  See application file for complete search history.

(56) References Cited

U.S. PATENT DOCUMENTS

| | | | |
|---|---|---|---|
| 2016/0187724 A1 | 6/2016 | Masuda et al. | |
| 2018/0120639 A1* | 5/2018 | Shih | G02F 1/1347 |
| 2018/0284546 A1* | 10/2018 | Tsuda | G02F 1/134309 |

\* cited by examiner

|  | QUANTITY OF LIGHT TRANSMITTED TO FRONT SIDE | QUANTITY OF LIGHT TRANSMITTED TO BACK SIDE |
|---|---|---|
| FIRST BASIC STADY (DISPLAY 11) | 0.25 | 0.5 |
| SECOND BASIC STADY (DISPLAY 12) | 0.5 | 0 |

FIG. 5

FIG. 9
(A)
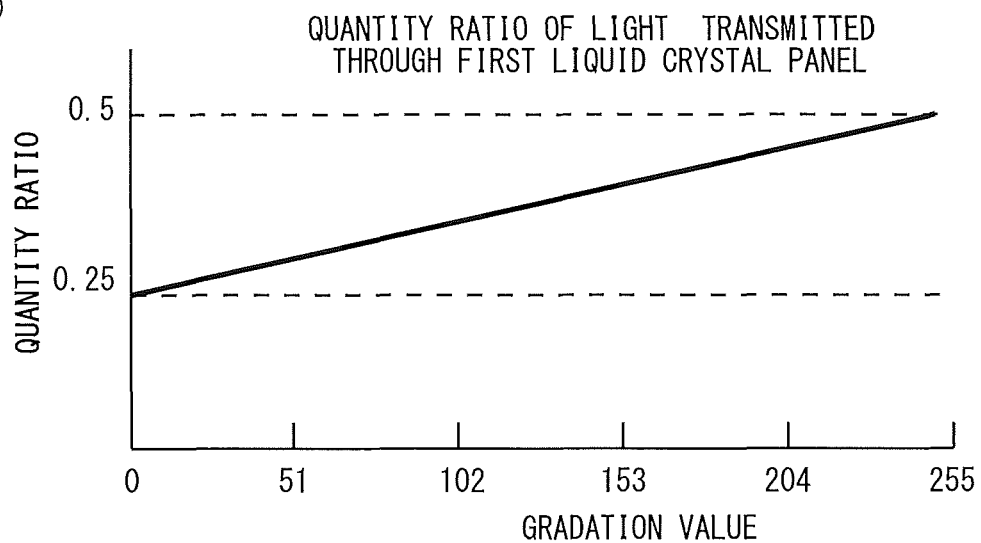
(B)
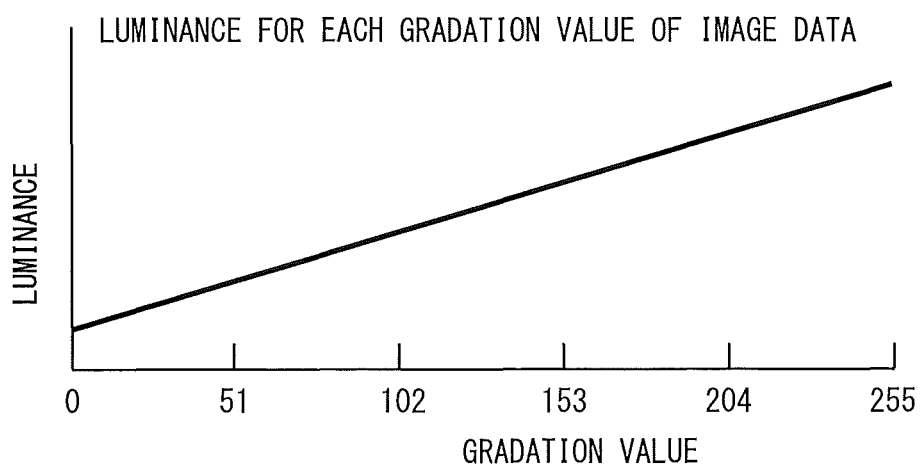
(C)
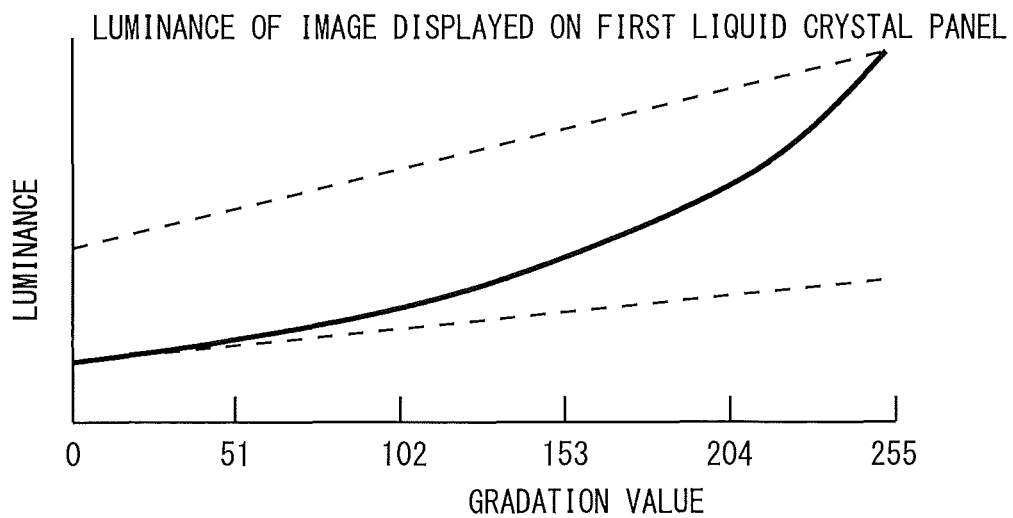

FIG. 14
(A)
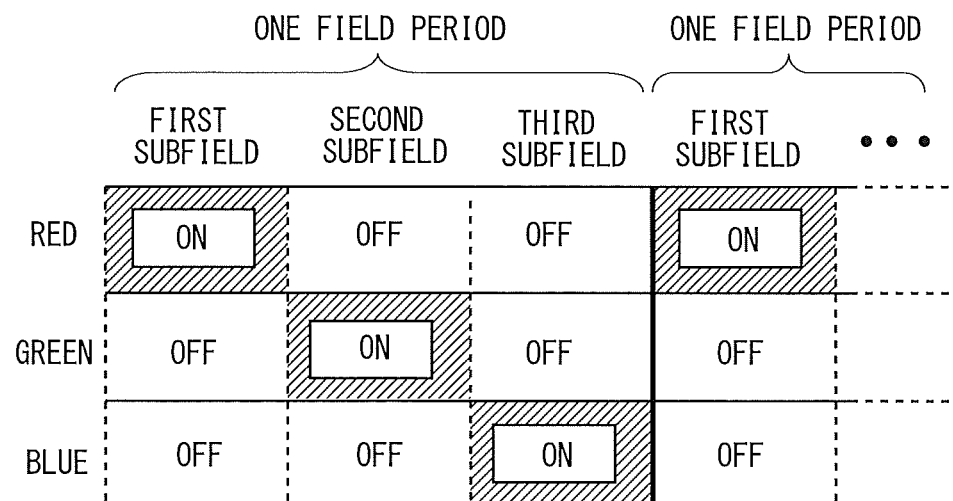
(B)
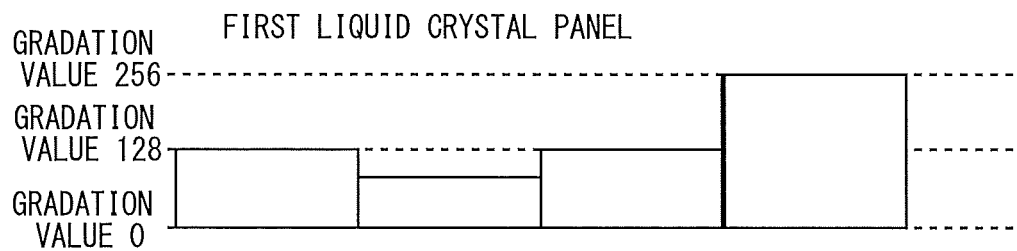
(C)
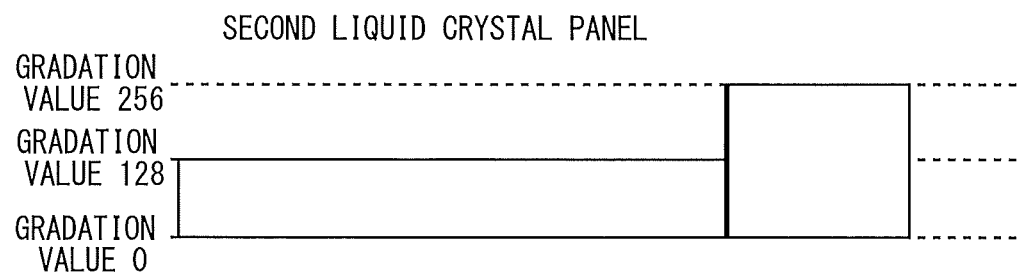

DISPLAY DEVICE WITH DISPLAY PRESENTING IMAGE BASED ON EXTERNALLY PROVIDED IMAGE DATA AND DOUBLING AS SEE-THROUGH DISPLAY

TECHNICAL FIELD

The present invention relates to display devices, particularly to a display device functioning as a see-through display and enhancing the contrast ratio of a display image.

BACKGROUND ART

Recent years have seen active development of display devices with displays capable of not only displaying images based on externally provided image data but also allowing objects on the back side to be seen through screens from the front side (hereinafter, such a display will also be referred to as a "see-through display". Such a see-through display adjusts luminances for high and low gradation values by modulating the polarization of light from a light source. In this case, the luminances increase at the same rate, resulting in no change in display image contrast ratio. Accordingly, image display quality cannot be enhanced.

Patent Document 1 describes a display device with display quality enhanced by increasing a video contrast ratio. Patent Document 1 also describes a projection display system including a reflective or transmissive panel (e.g., an LCoS panel) disposed so as to be able to receive incident light. Such a panel outputs incident light to a projection element after some adjustments based on applied signals. Such a display system can enhance the contrast ratio of a video displayed on a screen by disposing a low-retardance film at least on an input optical path or an output optical path.

CITATION LIST

Patent Document

Patent Document 1: Japanese Translation of PCT International Application Publication No. 2005-502070

SUMMARY OF THE INVENTION

Problems to be Solved by the Invention

However, the projection display system disclosed in Patent Document 1 displays a video on the screen by irradiating the screen with light based on red, green, and blue components obtained from a video signal. Accordingly, for the viewer watching the video displayed on the screen, the contrast ratio is the proportion of the luminance of the video and the luminance of the screen where no video is displayed. When the surroundings of the screen are dark, the luminance of the screen is zero, and therefore, the contrast ratio is maximized. However, in most cases, the surroundings of the screen are not completely dark, and ambient brightness changes, with the result that, even when the same video continues to be displayed, the contrast ratio changes. Therefore, it is difficult for the display system disclosed in Patent Document 1 to enhance the contrast ratio without being affected by ambient brightness.

Therefore, an objective of the present invention is to provide a display device enhancing an image contrast ratio and hence display quality without being affected by ambient brightness.

Solution to the Problems

A first aspect of the present invention is directed to a display device with a display presenting an image based on externally provided image data and doubling as a see-through display, wherein, the display includes:
a light source configured to emit light including a first polarized wave and a second polarized wave having a polarization axis perpendicular to a polarization axis of the first polarized wave;
a light guide plate configured to emit the light derived from the light source, toward front and back sides of the display;
a first polarization modulation element disposed on the front side relative to the light guide plate and having a plurality of pixels formed thereon;
absorptive polarizing plates respectively disposed on front-side and back-side surfaces of the first polarization modulation element;
a second polarization modulation element disposed on the back side relative to the light guide plate and having formed thereon a pixel or pixels whose number is equal to or less than the pixels of the first polarization modulation element;
a polarizing plate disposed on a front-side surface of the second polarization modulation element; and
a reflective polarizing plate disposed on a back-side surface of the second polarization modulation element,
wherein the second polarization modulation element is driven with gradation representation in accordance with a gradation value of an image displayed on the first polarization modulation element, so as to control a quantity of light with which the light source illuminates the first polarization modulation element.

According to a second aspect of the present invention, in the first aspect of the present invention, the second polarization modulation element has the same number of pixels as the first polarization modulation element.

According to a third aspect of the present invention, in the second aspect of the present invention, the pixels of the first polarization modulation element and the pixels of the second polarization modulation element that correspond to the pixels of the first polarization modulation element are driven with gradation representation by drive image signals generated based on the same image data.

According to a fourth aspect of the present invention, in the second aspect of the present invention,
the first polarization modulation element is driven with gradation representation in a field-sequential mode by the light source emitting light in different colors for respective subfield periods included in a field period, and
the second polarization modulation element is driven with gradation representation for one field period by a luminance adjustment image signal generated based on a highest gradation image signal representing the same gradation value as the highest of all gradation values during the respective subfield periods included in the field period.

According to a fifth aspect of the present invention, in the fourth aspect of the present invention,
the display further includes:
a scanning signal line driver circuit configured to generate scanning signals for selectively activating a plurality of scanning signal lines formed in the second polarization modulation element and to provide the scanning signals to the scanning signal lines;

a data signal line driver circuit configured to generate the luminance adjustment image signal and provide the luminance adjustment image signal to a plurality of data signal lines formed in the second polarization modulation element; and a display control circuit configured to generate control signals for controlling operations of the scanning signal line driver circuit and the data signal line driver circuit and to provide the control signals respectively to the scanning signal line driver circuit and the data signal line driver circuit, wherein the highest gradation image signal is generated based on the image data by an arithmetic circuit provided in either the display control circuit or the data signal line driver circuit.

According to a sixth aspect of the present invention, in the first aspect of the present invention, the second polarization modulation element has fewer pixels than the first polarization modulation element.

According to a seventh aspect of the present invention, in the sixth aspect of the present invention, the pixel of the second polarization modulation element has integer-multiple lengths in row and column directions compared to the pixel of the first polarization modulation element, numbers of pixels of the first polarization modulation element in vertical and horizontal directions are respectively divisible by numbers of pixels of the second polarization modulation element in the vertical and horizontal directions, pixel frames that partition the pixels of the first polarization modulation element and pixel frames that partition the pixels of the second polarization modulation element are formed so as to be positioned on each other when the first polarization modulation element and the second polarization modulation element are disposed in the display, and the pixels of the second polarization modulation element are driven with gradation representation by luminance adjustment image signals generated based on average gradation image signals representing average gradation values for respectively corresponding sets of pixels of the first polarization modulation element.

According to an eighth aspect of the present invention, in the sixth aspect of the present invention, the second polarization modulation element includes one pixel having the same length as a total length of all the pixels of the first polarization modulation element in each of the row and column directions, and the pixel of the second polarization modulation element is driven with gradation representation by a luminance adjustment image signal generated based on an average gradation image signal representing an average gradation value for all the pixels of the first polarization modulation element.

According to a ninth aspect of the present invention, in the seventh or eighth aspect of the present invention, the display further includes:

a scanning signal line driver circuit configured to generate scanning signals for selectively activating a plurality of scanning signal lines formed in the second polarization modulation element and to provide the scanning signals to the scanning signal lines;

a data signal line driver circuit configured to generate the luminance adjustment image signal and provide the luminance adjustment image signal to a plurality of data signal lines formed in the second polarization modulation element; and a display control circuit configured to generate control signals for controlling operations of the scanning signal line driver circuit and the data signal line driver circuit and to provide the control signals respectively to the scanning signal line driver circuit and the data signal line driver circuit, wherein the average gradation image signal is generated based on the image data by an arithmetic circuit provided in either the display control circuit or the data signal line driver circuit.

According to a tenth aspect of the present invention, in the first aspect of the present invention, the polarizing plate disposed on the front-side surface of the second polarization modulation element is an absorptive polarizing plate.

According to an eleventh aspect of the present invention, in the first aspect of the present invention, the first polarization modulation element and the second polarization modulation element are liquid crystal panels.

According to a twelfth aspect of the present invention, in the eleventh aspect of the present invention, the first polarization modulation element and the second polarization modulation element are normally white liquid crystal panels.

According to a thirteenth aspect of the present invention, in the eleventh aspect of the present invention, the liquid crystal panels are twisted noematic panels.

Effect of the Invention

In the first aspect, the second polarization modulation element is driven in accordance with the gradation value of an image displayed on the first polarization modulation element, thereby enhancing contrast ratios of still and video images. Thus, display quality is enhanced for still and video images.

In the second aspect, the first polarization modulation element has the same number of pixels as the second polarization modulation element. Therefore, each pixel of the second polarization modulation element can be driven according to the gradation value of the image displayed on the corresponding pixel of the first polarization modulation element. Thus, display image luminance for still and video images can be controlled in more detail, with the result that contrast ratios of the still and video images can be readily enhanced.

In the third aspect, the second polarization modulation element is driven in accordance with the gradation value of an image displayed on the first polarization modulation element so as to achieve higher absolute values for the quantity and the luminance of light illuminating the first polarization modulation element. In this case, when compared to the conventional art, the luminance for a low gradation value does not change, but the luminance for a high gradation value increases. As a result, higher absolute values can be achieved for the quantity and the luminance of light illuminating the first polarization modulation element, whereby the contrast ratio of an image displayed on the first polarization modulation element and the display quality of the image are enhanced. Thus, image display quality can be enhanced not only for video display but also for still image display.

In the fourth aspect, the first polarization modulation element is sequentially provided with drive image signals for displaying images with different gradation values during respective subfield periods included in one field period. In this case, the second polarization modulation element is provided with a luminance adjustment image signal representing the highest gradation value during all of the subfield periods. As a result, even when the first polarization modulation element is driven at high speed in a field-sequential mode, the second polarization modulation element can adequately follow the operation speed of the first polarization modulation element. Thus, it is possible to increase the quantity of light transmitted to the front side and thereby enhance the luminance of a display image, resulting in an increased image contrast ratio.

In the fifth aspect, the highest gradation image signal for the same gradation value as the highest of the gradation values during the subfield periods included in one field period is produced based on an image signal by the arithmetic circuit provided in the display control circuit or the data signal line driver circuit. Thus, the highest gradation image signal can be readily produced.

In the sixth aspect, the pixel size of the second polarization modulation element is larger than the pixel size of the first polarization modulation element, and therefore, the proportion of a switching element provided in each pixel relative to the pixel decreases. As a result, the pixel of the second polarization modulation element correspondingly increases in transmittance, and therefore, the quantity of light transmitted through the second polarization modulation element can be increased. Thus, the quantity of light illuminating the first polarization modulation element increases for the high gradation value, resulting in an enhanced display image luminance.

In the seventh aspect, when the first polarization modulation element is viewed from the front side of the display, the pixel frames that partition the pixels of the first polarization modulation element appear to lie exactly on the pixel frames that partition the pixels of the second polarization modulation element. Thus, light emitted by the second polarization modulation element illuminates the first polarization modulation element without being blocked by the pixel frames of the first polarization modulation element, and therefore, the first polarization modulation element can efficiently utilize the illumination.

In the eighth aspect, the second polarization modulation element includes one pixel having the same size as the total size of all the pixels of the first polarization modulation element and is driven with gradation representation by a luminance adjustment image signal representing an average luminance for all the pixels of the first polarization modulation element for each frame period. Thus, while the still image contrast ratio does not change, the video contrast ratio can be enhanced to up to two times.

In the ninth aspect, the average gradation image signal based on the average gradation value for all or some of the pixels of the first polarization modulation element is generated for each frame period by the arithmetic circuit provided in the display control circuit or the data signal line driver circuit. Thus, the average gradation image signal can be readily obtained.

In the tenth aspect, the polarizing plate disposed between the light guide plate and the second polarization modulation element is an absorptive polarizing plate and absorbs either a first or second polarized wave emitted toward the back side by the light guide plate. Thus, the absorbed polarized wave is not transmitted to the back side, resulting in less glare perceived by the viewer on the back side of the display.

In the eleventh aspect, the first and second polarization modulation elements are liquid crystal panels, and therefore, the polarization of incident light can be readily controlled.

In the twelfth aspect, the first and second polarization modulation elements are normally white liquid crystal panels, and therefore, when these liquid crystal panels are powered off, the see-through display function is effected, so that the viewer can see the back or front side through the liquid crystal panels. Thus, power consumed by the see-through display function can be reduced.

In the thirteenth aspect, the first and second polarization modulation elements are twisted nematic liquid crystal panels, and therefore, first and second polarized waves can be readily converted therebetween.

BRIEF DESCRIPTION OF THE DRAWINGS

FIG. 5 is a table for comparison between the first and second basic studies.

FIG. 9 provides graphs showing the relationship between gradation value and quantity of light transmitted through the first liquid crystal panel in the display of the liquid crystal display device shown in FIG. 6 or luminance of an image displayed on the first liquid crystal panel; more specifically, part (A) is a graph showing the quantity proportion (quantity ratio) of light transmitted through the first liquid crystal panel to the front side in all light emitted by the light guide plate, part (B) is a graph showing an example of luminance for image data provided to the first and second liquid crystal panels, for each gradation value, and part (C) is a graph showing the luminance of an image presented on the display, based on the quantity ratio shown in part (A) and the image data luminance shown in part (B).

FIG. 14 provides diagrams showing the relationship between lighting statuses of a light source and images displayed on the first and second liquid crystal panels of the liquid crystal display device shown in FIG. 12; more specifically, part (A) is a diagram showing ON/OFF states of red, green, and blue LEDs during first through third subfield periods, part (B) is a diagram showing a gradation value represented by a drive image signal provided to the first liquid crystal panel, for each subfield period, and part (C) is a diagram showing a gradation value represented by a luminance adjustment image signal provided to the second liquid crystal panel, for each subfield period.

MODES FOR CARRYING OUT THE INVENTION

1. Basic Studies

Before describing embodiments of the present invention, first and second basic studies, which were carried out by the inventor in order to clarify problems with conventional liquid crystal display devices that double as see-through displays, will be described.

<1.1 First Basic Study>

Figure 1:
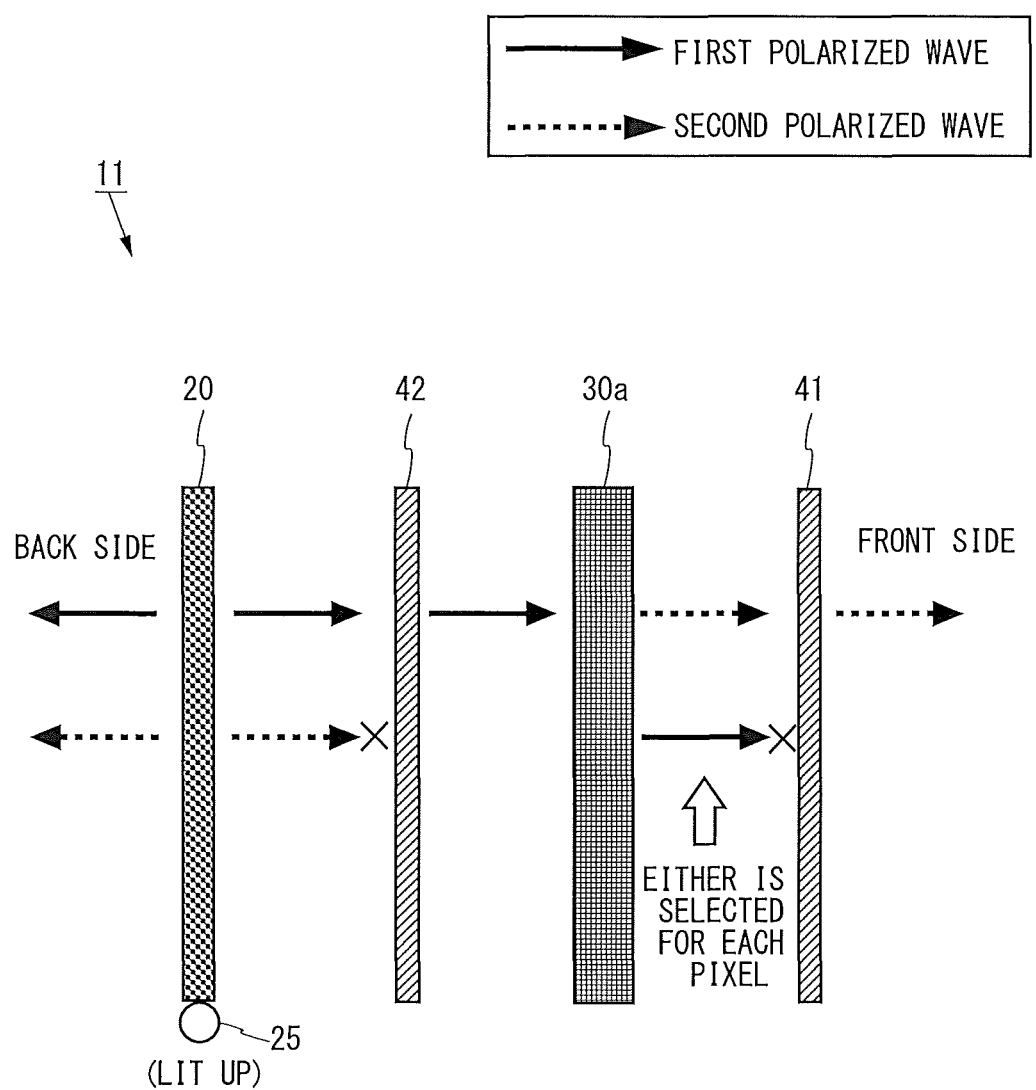
FIG. 1 is a diagram illustrating the configuration of a display used in a first basic study.

FIG. 1 is a diagram illustrating the configuration of a display 11 used in the first basic study. In the display 11, a first absorptive polarizing plate 41, a first liquid crystal panel 30a, a second absorptive polarizing plate 42, and a light guide plate 20 are disposed sequentially from front to back side, as shown in FIG. 1. Note that the first and second absorptive polarizing plates 41 and 42 have respective absorption axes perpendicular to each other. Moreover, the first liquid crystal panel 30a is a normally white panel driven in TN (twisted nematic) mode.

Since the first liquid crystal panel 30a is driven in TN mode, pixels of the first liquid crystal panel 30a that are in the state of not being driven (i.e., in OFF state), either where no drive image signal in accordance with provided image data is being written or where a 0V drive image signal is being written, output incident polarized waves after rotating respective polarization axes 90 degrees. On the other hand, once the state transitions to a drive state (i.e., ON state) where drive image signals are being written, the first liquid crystal panel 30a allows the polarized waves to be outputted without rotating the polarization axes.

The light guide plate 20 has attached to an edge a light source 25, including, for example, LEDs (light-emitting devices), as shown in FIG. 1. When the light source 25 is lit up (ON), light from the light source 25 is incident on the light guide plate 20, which emits the light toward the front and back sides. First and second polarized waves included in the light emitted toward the front side are incident on the second absorptive polarizing plate 42. The first polarized wave is transmitted through the second absorptive polarizing plate 42, and the second polarized wave is absorbed by the second absorptive polarizing plate 42.

After being transmitted through the second absorptive polarizing plate 42, the first polarized wave is incident on the first liquid crystal panel 30a. Since the first liquid crystal panel 30a is driven in TN mode, the first polarized wave that is incident on the first liquid crystal panel 30a at pixels in OFF state is outputted after being converted into a second polarized wave by the polarization axis being rotated 90 degrees. The first polarized wave that is incident on pixels in ON state is outputted without the polarization axis being rotated. The second polarized wave emitted by the first liquid crystal panel 30a is transmitted through the first absorptive polarizing plate 41 to the front side, whereas the first polarized wave is absorbed by the first absorptive polarizing plate 41.

Figure 2:
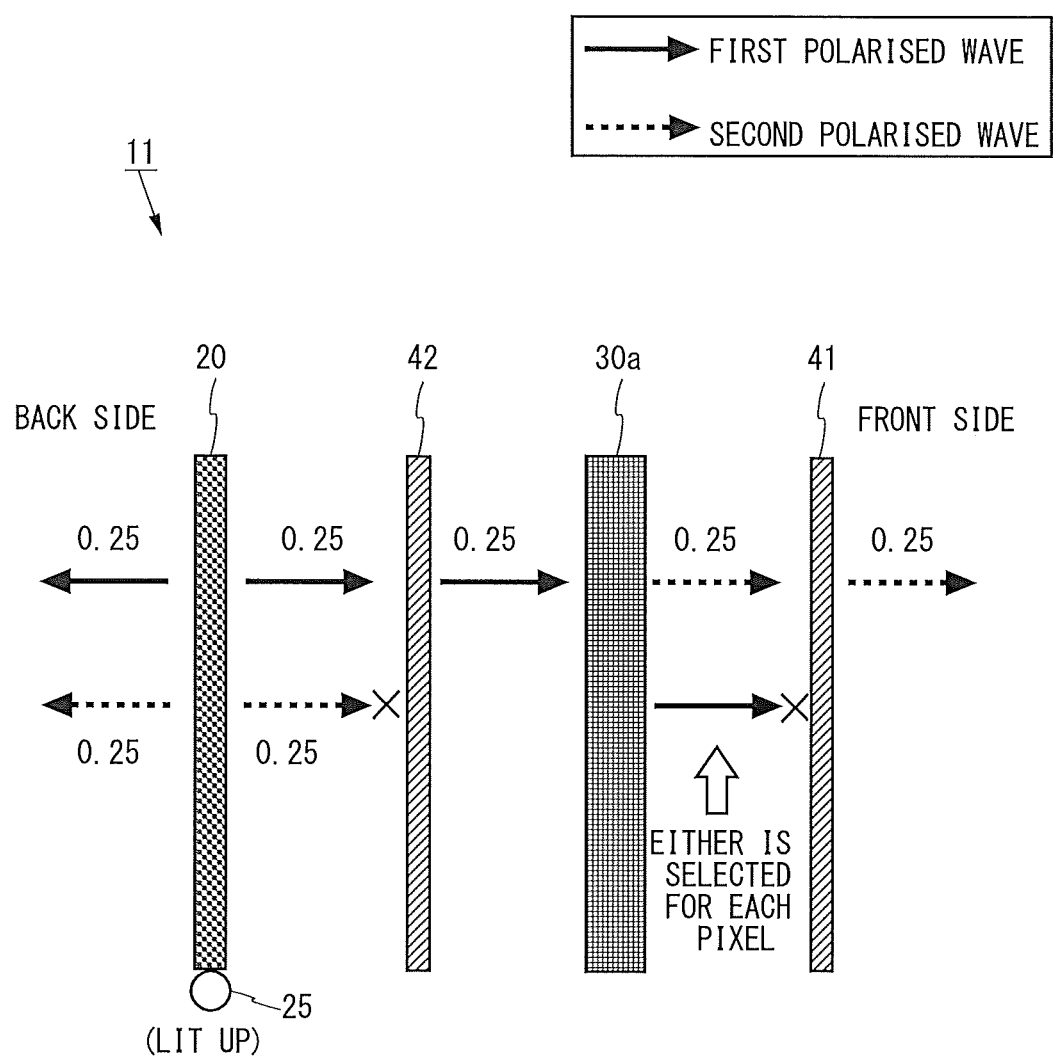
FIG. 2 is a diagram showing the quantity of light for each light trajectory in the display shown in FIG. 1.

FIG. 2 is a diagram showing the quantity of light for each light trajectory in the display 11. As shown in FIG. 2, the light guide plate 20 emits first and second polarized waves toward the front and back sides at an equal proportion, that is, "0.25". Accordingly, each of the first and second polarized waves is transmitted through the light guide plate 20 to the back side at a proportion of "0.25". As a result, the light that is transmitted to the back side consists of the first and second polarized waves, the total proportion of which is "0.5".

On the other hand, the proportion of the second polarized wave that reaches the front side after being converted from the first polarized wave emitted toward the front side by the light guide plate 20 is "0.25". Moreover, the second polarized wave that is emitted toward the front side by the light guide plate 20 at a proportion of "0.25" is absorbed by the first absorptive polarizing plate 41 and therefore cannot be transmitted to the front side. As a result, the second polarized wave converted from the first polarized wave is the only light that is transmitted to the front side, and the proportion thereof is "0.25".

In the first basic study, when the light source 25 is lit up, the first polarized wave included in the light emitted toward the front side by the light guide plate 20 is converted into the second polarized wave, which is transmitted through the first liquid crystal panel 30a toward the front side, and therefore contributes to screen brightness on the first liquid crystal panel 30a. However, the second polarized wave is absorbed by the second absorptive polarizing plate 42 and therefore does not contribute to screen brightness on the first liquid crystal panel 30a. Moreover, the first and second polarized waves emitted toward the back side by the light guide plate 20 are transmitted to the back side, and therefore, neither wave contributes to screen brightness. Thus, the light emitted by the light source 25 contributes to screen brightness at a proportion of "0.25".

<1.2 Second Basic Study>

Figure 3:
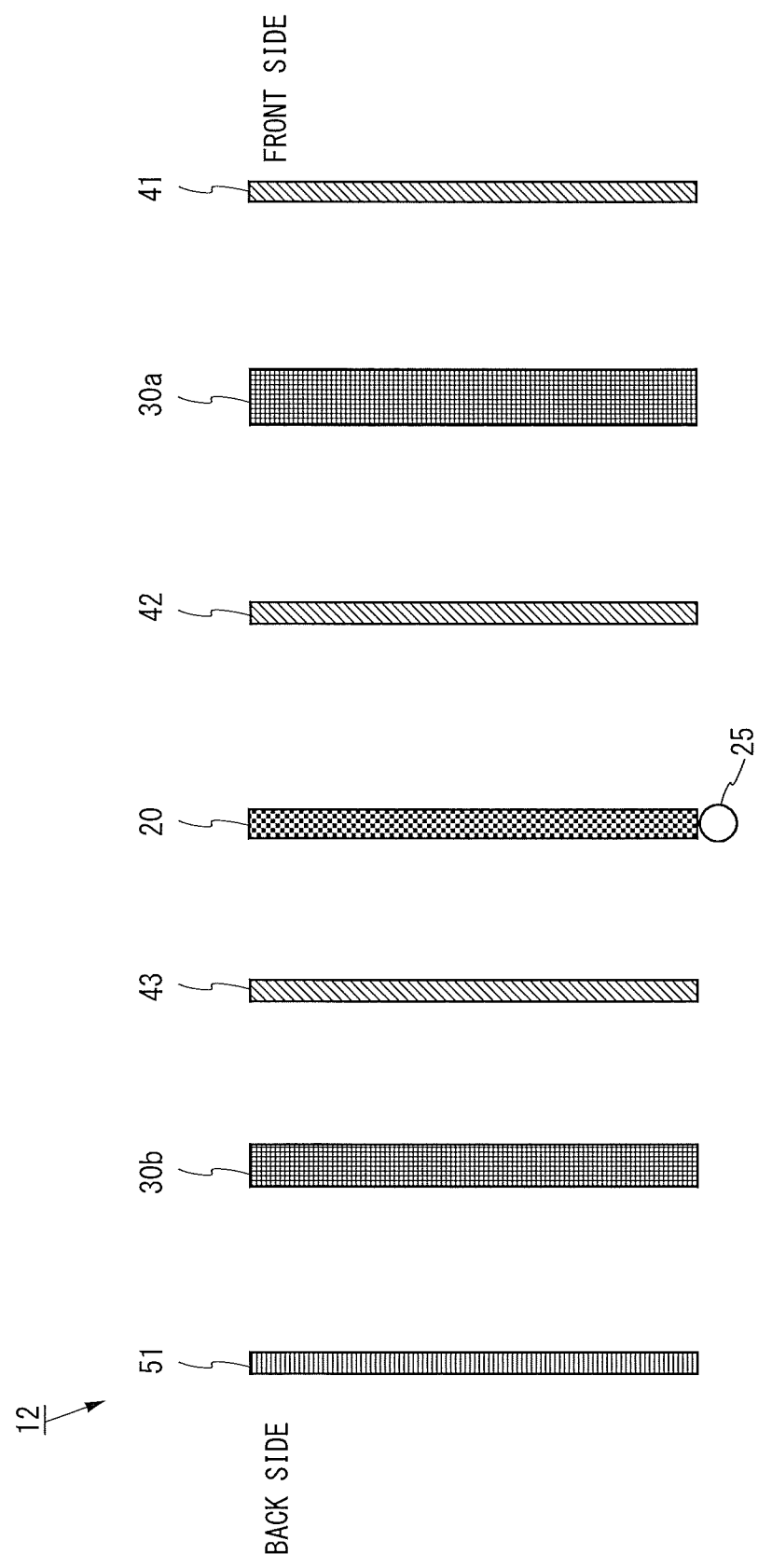
FIG. 3 is a diagram illustrating the configuration of a display used in a second basic study.

FIG. 3 is a diagram illustrating the configuration of a display 12 used in the second basic study. In the display 12, a first absorptive polarizing plate 41, a first liquid crystal panel 30a, a second absorptive polarizing plate 42, a light guide plate 20, a third absorptive polarizing plate 43, a second liquid crystal panel 30b, and a reflective polarizing plate 51 are disposed sequentially from front to back side, as shown in FIG. 3. In this manner, the display 12 is a display configured by additionally disposing the third absorptive polarizing plate 43, the second liquid crystal panel 30b, and the reflective polarizing plate 51 on the back side relative to the light guide plate 20 in the display 11 shown in FIG. 1. In this case, the third absorptive polarizing plate 43 has a transmission axis in the same direction as a reflection axis of the reflective polarizing plate 51 and a transmission axis of the second absorptive polarizing plate 42. Moreover, unlike the first liquid crystal panel 30a, the second liquid crystal panel 30b has only one pixel provided across the entirety thereof.

Figure 4:
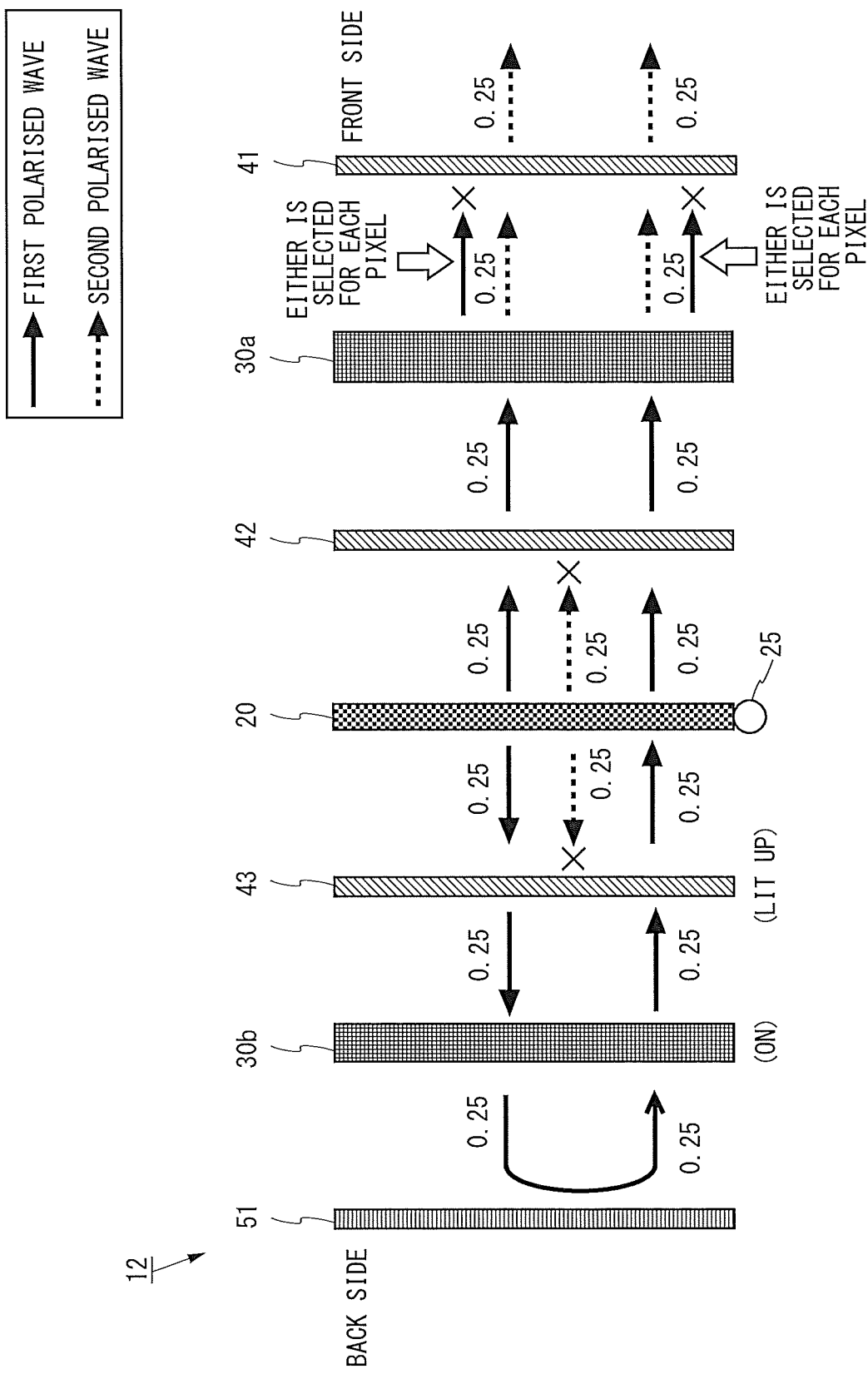
FIG. 4 is a diagram showing the quantity of light for each light trajectory in the display shown in FIG. 3.

FIG. 4 is a diagram showing the quantity of light for each light trajectory in the display 12. As shown in FIG. 4, the light guide plate 20 emits first and second polarized waves toward the front and back sides equally at a proportion of "0.25", and the second liquid crystal panel 30b is in ON state.

As described in the first basic study, of the light emitted toward the front side by the light guide plate 20, the second polarized wave converted from the first polarized wave by ON-state pixels of the first liquid crystal panel 30a is the only light that is transmitted through the first absorptive polarizing plate 41 to the front side, and the proportion thereof is "0.25".

Furthermore, the first polarized wave emitted toward the back side by the light guide plate 20 at a proportion of "0.25" is transmitted through the third absorptive polarizing plate 43 and also through the second liquid crystal panel 30b in ON-state and reflected toward the front side by the reflective polarizing plate 51. The reflected first polarized wave is transmitted sequentially through the second liquid crystal panel 30b in ON-state, the third absorptive polarizing plate 43, the light guide plate 20, and the second absorptive polarizing plate 42, and strikes the first liquid crystal panel 30a at a proportion of "0.25". The first polarized wave incident on the first liquid crystal panel 30a at OFF-state pixels is converted into a second polarized wave, which is emitted at a proportion of "0.25". The first polarized wave incident on ON-state pixels is emitted without conversion and maintains the proportion of "0.25". Of these, the first polarized wave with the proportion of "0.25" is absorbed by the first absorptive polarizing plate 41, and therefore, only the second polarized wave with the proportion of "0.25" is transmitted through the first absorptive polarizing plate 41 to the front side. Moreover, the second polarized wave emitted toward the back side by the light guide plate 20 at a proportion of "0.25" is absorbed by the third absorptive polarizing plate 43.

The following can be appreciated from the above results. The light that reaches the front side includes the second polarized wave converted from the first polarized wave emitted toward the front side by the light guide plate 20 at a proportion of "0.25" and also includes the second polarized wave converted by the OFF-state pixels of the first liquid crystal panel 30a from the first polarized wave emitted toward the back side by the light guide plate 20 at a proportion of "0.25" and reflected by the reflective polarizing plate 51. The total proportion of these second polarized waves is "0.5". Accordingly, in the second basic study, the quantity of light transmitted to the front side is twice as much as in the first basic study. In this case, the proportion of each of the first and second polarized waves transmitted to the back side is "0".

FIG. 5 is a table for comparison between the first and second basic studies. As shown in FIG. 5, the proportion of the quantity of light that reaches the front side is "0.5" in the second basic study and is twice as much as the proportion of "0.25" in the first basic study. Accordingly, the display 12 in the second basic study has a brighter screen than the display 11 in the first basic study.

The following are calculations of contrast ratios respectively for images displayed by the displays 11 and 12 in the first and second basic studies. The quantity of light that reaches the front side is "0.25" for the display 11 in the first basic study, as shown in FIG. 5. In this case, assuming that luminance is a for the gradation value 0 and also b for the gradation value 255, the contrast ratio of an image displayed by the display 11 is expressed by the following equation (1):

$$b:a=b/a:1 \quad (1)$$

Next, as for the display 12 in the second basic study, the quantity of light that reaches the front side is "0.5", which is twice as much as in the first basic study. Accordingly, assuming that the luminance of the display 11 is a for the gradation value 0 and also b for the gradation value 255, the luminance of the display 12 is expressed as 2a for the gradation value 0 and also 2b for the gradation value 255. Therefore, the contrast ratio of an image displayed by the display 12 is expressed by the following equation (2):

$$2b:2a=b/a:1 \quad (2)$$

In the second basic study, the quantity of light that is transmitted to the front side is twice as much as in the first basic study, as shown in FIG. 5. However, as expressed by equations (1) and (2), the contrast ratio of an image displayed on the first liquid crystal panel 30a is the same for both the displays 11 and 12. Therefore, it can be appreciated that the display 12 is not an improvement to the display 11 in terms of contrast ratio.

Accordingly, the following embodiments will be described with respect to liquid crystal display devices capable of realizing higher contrast ratios and doubling as see-through displays.

2. First Embodiment

<2.1 Configuration of the Liquid Crystal Display Device>

Figure 6:
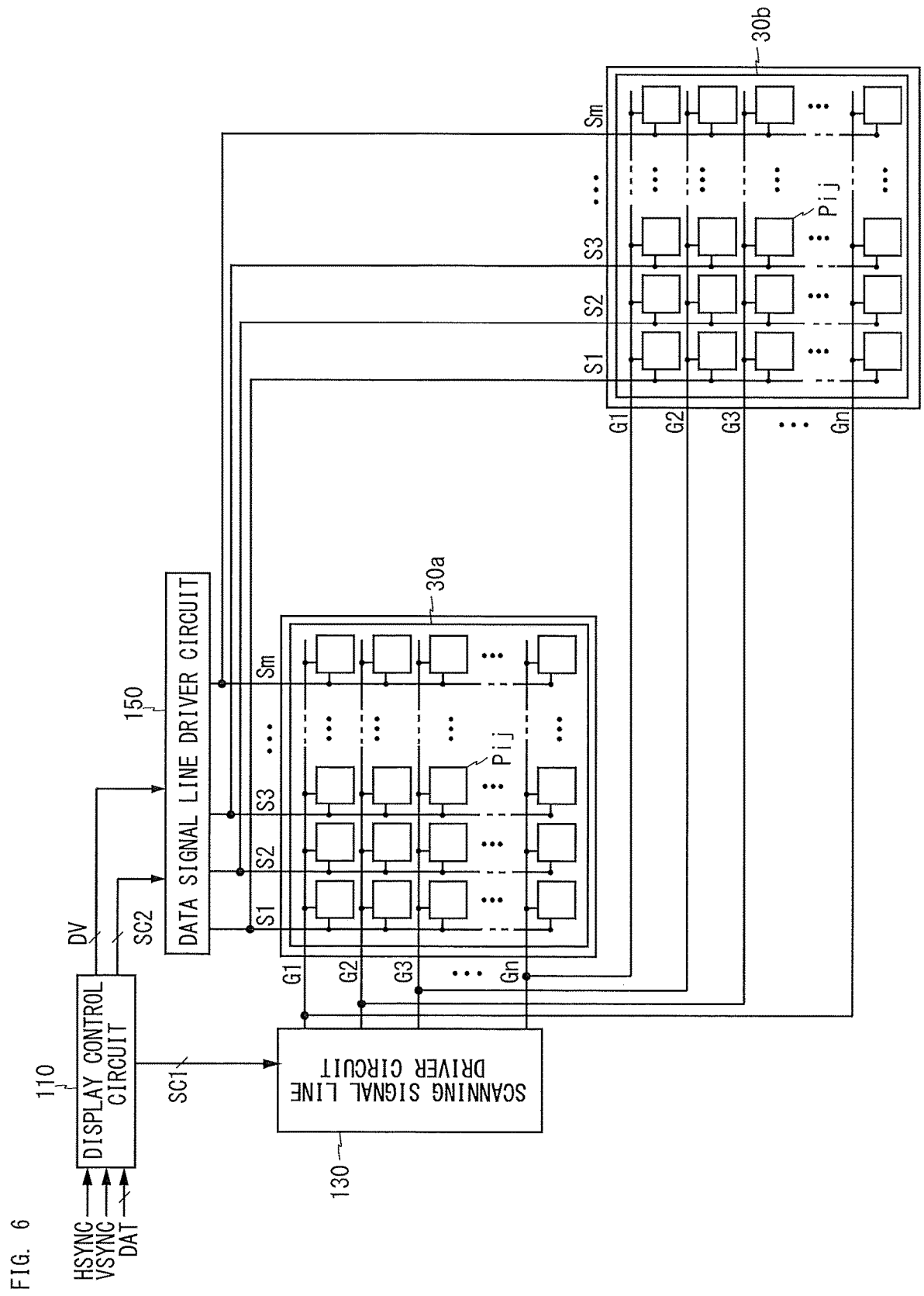
FIG. 6 is a block diagram illustrating the configuration of a liquid crystal display device according to a first embodiment of the present invention.

FIG. 6 is a block diagram illustrating the configuration of a liquid crystal display device according to a first embodiment of the present invention. The liquid crystal display device is an active-matrix display device including a first liquid crystal panel 30a, a second liquid crystal panel 30b, a display control circuit 110, a scanning signal line driver circuit 130, and a data signal line driver circuit 150, as shown in FIG. 6. Note that the liquid crystal display device also includes a light guide plate disposed between the first liquid crystal panel 30a and the second liquid crystal panel 30b, a light source attached to an edge of the light guide plate, a light source driver circuit for driving the light source, and various polarizing plates disposed on surfaces of the first and second liquid crystal panels 30a and 30b, but any illustrations thereof are omitted.

Each of the first and second liquid crystal panels 30a and 30b includes n scanning signal lines $G_1$ to $G_n$, m data signal lines $S_1$ to $S_m$, and (m×n) pixels $P_{ij}$ (where m and n are integers of 2 or more, i is an integer of from 1 to n, and j is an integer of from 1 to m). The scanning signal lines $G_1$ to $G_n$ are disposed parallel to each other, and the data signal lines $S_1$ to $S_m$ are disposed parallel to each other so as to cross the scanning signal lines $G_1$ to $G_n$. The pixels $P_{ij}$ are disposed near intersections of the scanning signal lines $G_i$ and the data signal lines $S_j$. In this manner, the (m×n) pixels $P_{ij}$ are disposed in a matrix with each row consisting of m pixels and each column consisting of n pixels. The scanning signal line $G_i$ is connected in common to the pixels $P_{ij}$ in the i'th row, and the data signal line $S_j$ is connected in common to the pixels $P_{ij}$ in the j'th column. Note that to allow color image display, the first liquid crystal panel 30a has red, green, and blue filters formed for each pixel. On the other hand, the second liquid crystal panel 30b is a panel for controlling the quantity of light to be transmitted and therefore has no color filters formed thereon.

The display control circuit 110 of the liquid crystal display device is externally provided with control signals, such as a horizontal synchronization signal HSYNC and a vertical synchronization signal VSYNC, and image data DAT. In accordance with these signals, the display control circuit 110 generates and outputs a control signal SC1, including a clock signal and a gate start pulse signal GST, to the scanning signal line driver circuit 130, and also generates and outputs a digital image signal DV and a control signal SC2, including a source start pulse signal, a source clock signal, and a latch strobe signal, to the data signal line driver circuit 150.

In accordance with the control signal SC1, the scanning signal line driver circuit 130 applies scanning signals sequentially to the scanning signal lines $G_1$ to $G_n$ of the first and second liquid crystal panels 30a and 30b one by one so as to activate the scanning signal lines $G_1$ to $G_n$. As a result, the scanning signal lines $G_1$ to $G_n$ are sequentially selected one by one, whereby the pixels $P_{ij}$ are collectively selected in one row at a time. In accordance with the control signal SC2 and the digital image signal DV, the data signal line driver circuit 150 generates and applies drive image signals, which are analog signals, to the data signal lines $S_1$ to $S_m$. As a result, the drive image signals are written in the selected pixels $P_{ij}$ of the first and second liquid crystal panels 30a and 30b, in one row at a time. In this case, drive image signals of the same voltage value are written in corresponding pixels of the first and second liquid crystal panels 30a and 30b.

In this manner, in the present embodiment, the first and second liquid crystal panels 30a and 30b are simultaneously provided with the same drive image signals, and therefore, one scanning signal line driver circuit 130 and one data signal line driver circuit 150 are simply provided and shared by the first and second liquid crystal panels 30a and 30b.

It should be noted that each of the first and second liquid crystal panels 30a and 30b may be provided with a set of scanning signal line driver circuit and data signal line driver circuit. Alternatively, one of the scanning signal line driver circuit or the data signal line driver circuit may be provided for each of the first and second liquid crystal panels 30a and 30b, and the other may be shared between the first and second liquid crystal panels 30a and 30b.

<2.2 Configuration of the Display>

The configuration of a display 15 included in the liquid crystal display device in the present embodiment is the same as the configuration of the display 12 used in the second basic study shown in FIG. 3, and therefore, any description thereof will be omitted. Note that while the second liquid crystal panel 30b of the display 12 has only one pixel provided across the entirety thereof, the second liquid crystal panel 30b in the present embodiment, as with the first liquid crystal panel 30a, has a plurality of pixels formed thereon.

The first liquid crystal panel 30a is a liquid crystal panel provided with a plurality of pixels, and polarized waves incident on ON-state pixels are emitted without polarization conversion. As for OFF-state pixels, incident polarized waves experience polarization conversion before emission. For example, a first polarized wave transmitted through the second absorptive polarizing plate 42 and incident on OFF-state pixels is converted into a second polarized wave. Accordingly, the first polarized wave transmitted through the second absorptive polarizing plate 42 is converted into a second polarized wave, which is transmitted through the first absorptive polarizing plate 41. On the other hand, the first polarized wave transmitted through the second absorptive polarizing plate 42 and incident on ON-state pixels is transmitted through the ON-state pixels without conversion. Accordingly, the first polarized wave transmitted through the second absorptive polarizing plate 42 is absorbed by the first absorptive polarizing plate 41.

It should be noted that the conversion may be performed so as to not only completely change one polarization state to the other but also allow for both polarization states. In such a case, incident light is transmitted in part through the polarizing plate disposed on the front side relative to the first liquid crystal panel 30a, with the result that an image or a background can be displayed with intermediate gradation values.

The light guide plate 20 is made of a transparent resin, such as acrylic or polycarbonate, or glass, and has a dotted pattern formed thereon or a diffusing agent, such as silica, applied thereto, so as to emit incident light derived from the light source 25, toward the front and back sides. The light guide plate 20 has attached to an edge the light source 25, including, for example, LEDs for emitting red, green, and blue light. Accordingly, when the light source 25 is lit up, light emitted by the light source 25 is incident on the light guide plate 20 and travels through the light guide plate 20 while repeatedly experiencing total reflections on surfaces of the light guide plate 20, until the light exits the light guide plate 20 toward the front or back side upon incidence on the dotted pattern or the diffusing agent.

Figure 7:
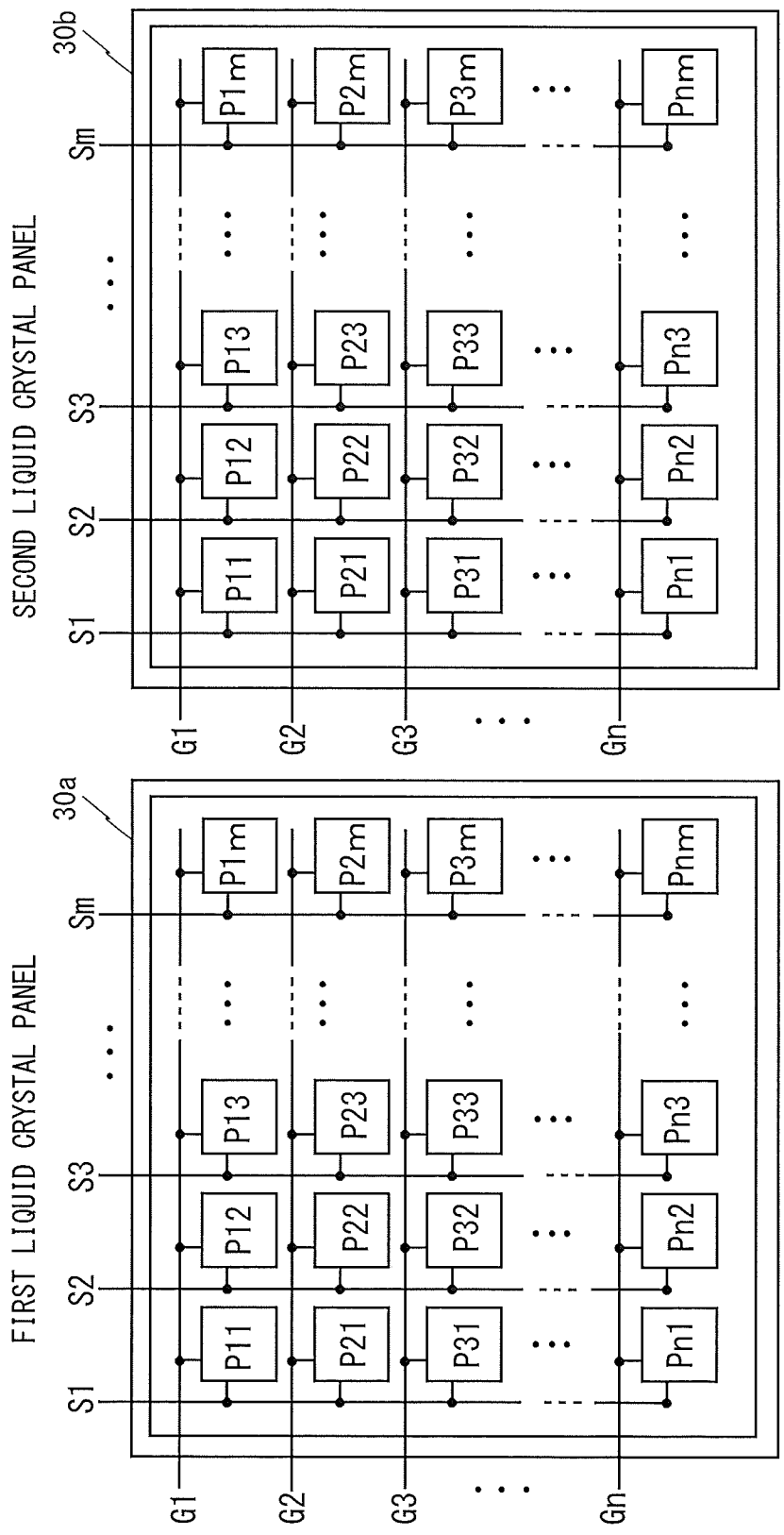
FIG. 7 is a diagram illustrating the configurations of first and second liquid crystal panels of the liquid crystal display device shown in FIG. 6.

Unlike in the case of the display 12 described in the second basic study, the second liquid crystal panel 30b in the present embodiment, as with the first liquid crystal panel 30a, is a liquid crystal panel provided with a plurality of pixels. FIG. 7 is a diagram illustrating the configurations of the first and second liquid crystal panels 30a and 30b. As shown in FIG. 7, the pixels formed on the first and second liquid crystal panels 30a and 30b are equal in size and arrangement. Accordingly, in the case where the first and second liquid crystal panels 30a and 30b are disposed one in front of the other, when the first liquid crystal panel 30a is viewed from the front side toward the back side, pixel frames that partition the pixels of the first liquid crystal panel 30a appear to lie exactly on pixel frames that partition the pixels of the second liquid crystal panels 30b.

As for the second liquid crystal panel 30b also, ON-state pixels transmit incident light therethrough without polarization conversion, and OFF-state pixels transmit incident light therethrough after polarization conversion. In this manner, the second liquid crystal panel 30b also can emit a polarized wave after polarization conversion for each pixel or without polarization conversion.

<2.3 Light Trajectories>

Figure 8:
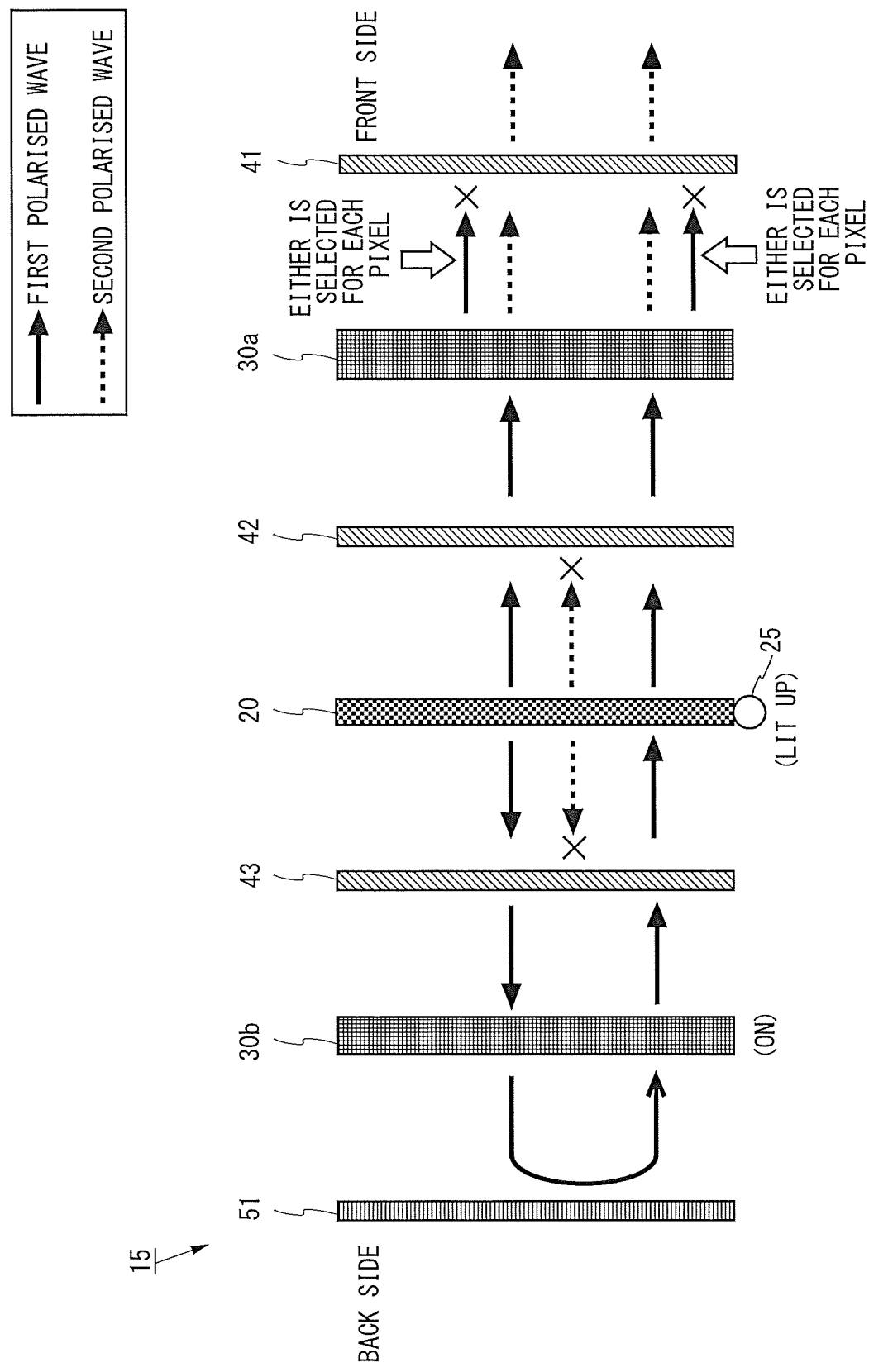
FIG. 8 is a diagram illustrating light trajectories in a display of the liquid crystal display device shown in FIG. 6 where light emitted by a light guide plate upon lighting of a light source is transmitted to a front side.

FIG. 8 is a diagram illustrating light trajectories in the display 15 where light emitted by the light guide plate 20 upon lighting of the light source 25 is transmitted to the front side. As shown in FIG. 8, the light source 25 is lit up. First and second polarized waves emitted toward the front side by the light guide plate 20 are incident on the second absorptive polarizing plate 42. Of the incident light, the second polarized wave is absorbed by the second absorptive polarizing plate 42, and the first polarized wave is transmitted through the second absorptive polarizing plate 42. Light trajectories along which the first polarized wave transmitted through the second absorptive polarizing plate 42 strikes the first liquid crystal panel 30a and is transmitted to the front side are the same as in the case shown in FIG. 4, and therefore, any descriptions thereof will be omitted.

A first polarized wave emitted toward the back side by the light guide plate 20 is transmitted through the third absorptive polarizing plate 43 and strikes the second liquid crystal panel 30b. Because each pixel of the second liquid crystal panel 30b is in ON state, the first polarized wave incident on the second liquid crystal panel 30b is not changed in polarization by the second liquid crystal panel 30b and strikes the reflective polarizing plate 51. The first polarized wave is reflected toward the front side by the reflective polarizing plate 51, whose reflection axis is in the same direction as a transmission axis of the third absorptive polarizing plate 43, with the result that the first polarized wave is transmitted sequentially through the second liquid crystal panel 30b, the third absorptive polarizing plate 43, the light guide plate 20, and the second absorptive polarizing plate 42 and strikes the first liquid crystal panel 30a. Light trajectories along which the first polarized wave incident on the first liquid crystal panel 30a reaches the front side is the same as in the case shown in FIG. 4, and therefore, any descriptions thereof will be omitted. Note that a second polarized wave emitted toward the back side by the light guide plate 20 is absorbed by the third absorptive polarizing plate 43.

Consequently, the viewer on the front side can see a screen that appears luminous (displayed in white) in places corresponding to OFF-state pixels of the first liquid crystal panel 30a and also appears to be displayed in black in places corresponding to ON-state pixels. In this manner, the display 15 is capable of providing a combination of luminous and black display representations.

<2.4 Relationship of Gradation with Light Quantity and Luminance>

Before describing the relationship between light trajectory and light quantity in the display 15 in the present embodiment, the relationship between light trajectory and light quantity will be reviewed for the displays 11 and 12 respectively used in the first and second basic studies. In both cases, it is assumed that the total quantity of light emitted toward the front and back sides by the light guide plate 20 upon lighting of the light source 25 is "1", and any loss of light quantity due to various members included in the displays 11 and 12 is ignored.

FIG. 9 provides graphs showing the relationship between gradation value and quantity of light transmitted through the first liquid crystal panel 30a of the display 15 in the present embodiment or luminance of an image displayed on the first liquid crystal panel 30a; more specifically, FIG. 9(A) is a graph showing the quantity proportion (quantity ratio) of light transmitted through the first liquid crystal panel 30a to the front side in all light emitted by the light guide plate 20, FIG. 9(B) is a graph showing an example of luminance for image data provided to the first and second liquid crystal panels 30a and 30b, for each gradation value, and FIG. 9(C) is a graph showing the luminance of an image presented on the display 15, based on the quantity ratio shown in FIG. 9(A) and the image data luminance shown in FIG. 9(B).

As reviewed in the first and second basic studies, in the case of the displays 11 and 12, for any gradation values, the quantity ratio of light that reaches the front side to all the light emitted by the light guide plate 20 is "0.25" for the first basic study and "0.5" for the second basic study. Accordingly, in the case of the display 15 in the present embodiment, it is assumed that the quantity ratio is "0.25" for the gradation value 0 and "0.5" for the gradation value 255 and increases proportionally as the gradation value increases from 0 to 255.

When the first and second liquid crystal panels 30a and 30b of such a display 15 receive, for example, image data for which the relationship between gradation value and luminance is as shown in FIG. 9(B), the luminance of an image displayed on the first liquid crystal panel 30a is calculated as the product of the quantity ratio shown in FIG. 9(A) and the luminance shown in FIG. 9(B).

The luminance thus calculated for an image displayed on the first liquid crystal panel 30a of the display 15 is as shown in FIG. 9(C). The luminance gradually increases in slope as the gradation value increases from 0 to 255, as shown in FIG. 9(C). In this case, luminance A for the gradation value 0 in the present embodiment is the same as luminance a for the gradation value 0 in the first basic study. On the other hand, luminance B for the gradation value 255 in the present embodiment is higher than luminance 2b for the gradation value 255 in the second basic study. Accordingly, the contrast ratio in the present embodiment can be expressed by the following equation (3):

$$B:A=B/A:1>2b/a:1 \quad (3)$$

In this manner, in the case of the display 15, the luminance for the low gradation value is the same as in the case of the display 11 used in the first basic study. However, the luminance for the high gradation value is higher than that in the case of the display 12 used in the second basic study. Accordingly, the contrast ratio of the display 15 in the present embodiment increases with the gradation value, resulting in enhanced image display quality. Note that unless otherwise specified herein, the contrast ratio is referred to for both video and still images.

<2.5 Operation as the See-Through Display>

Figure 10:
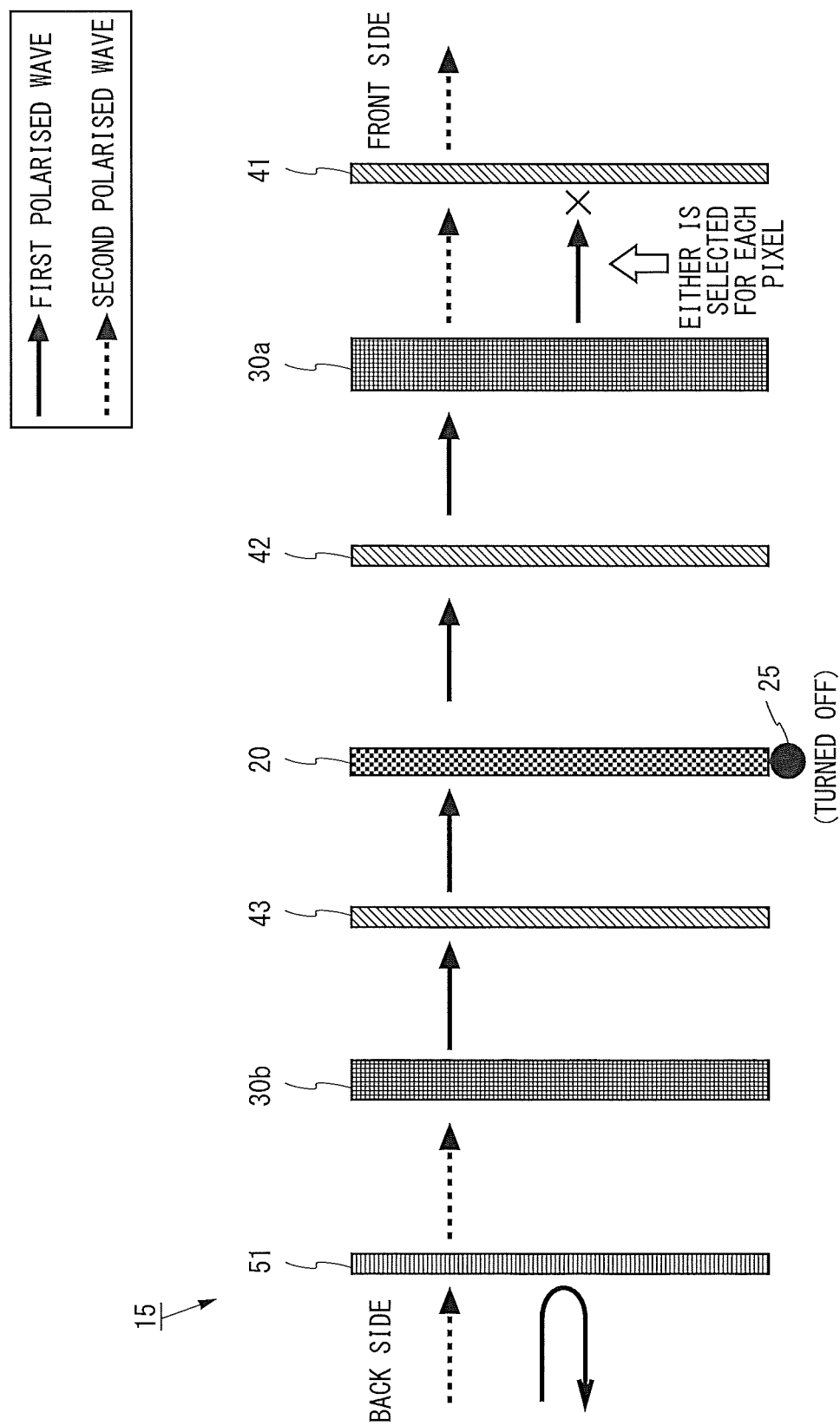
FIG. 10 is a diagram illustrating light trajectories in the display of the liquid crystal display device shown in FIG. 6 where light incident from a back side is transmitted to the front side.

The display 15 in the present embodiment is also used as a see-through display. FIG. 10 is a diagram illustrating light trajectories in the display 15 where light incident from the back side is transmitted to the front side. As shown in FIG. 10, each pixel of the second liquid crystal panel 30b is in OFF state, and the light source 25 is turned off. A first polarized wave incident from the back side is reflected toward the back side by the reflective polarizing plate 51.

A second polarized wave incident from the back side is transmitted through the reflective polarizing plate 51 and strikes the second liquid crystal panel 30b. Since the pixels of the second liquid crystal panel 30b are in OFF state, the second polarized wave is transmitted through the second liquid crystal panel 30b after being converted into a first polarized wave. The first polarized wave strikes the third absorptive polarizing plate 43 and is sequentially transmitted through the third absorptive polarizing plate 43, the light guide plate 20, and the second absorptive polarizing plate 42 to the first liquid crystal panel 30a because the third absorptive polarizing plate 43 has a transmission axis in the same direction as that of the reflective polarizing plate 51.

The first polarized wave incident on the first liquid crystal panel 30a follows the same light trajectory as in the second basic study shown in FIG. 4, and therefore, any description of the trajectory will be omitted. Consequently, the first polarized wave is converted into a second polarized wave while being transmitted through OFF-state pixels of the first liquid crystal panel 30a, and the second polarized wave is transmitted through the second absorptive polarizing plate 42 to the front side. On the other hand, some portion of the first polarized wave is transmitted through ON-state pixels of the first liquid crystal panel 30a without conversion and absorbed by the first absorptive polarizing plate 41 after exiting the first liquid crystal panel 30a. Accordingly, the viewer on the front side can see the back side in places corresponding to the OFF-state pixels and also the screen that appears to be displayed in black in places corresponding to the ON-state pixels.

Figure 11:
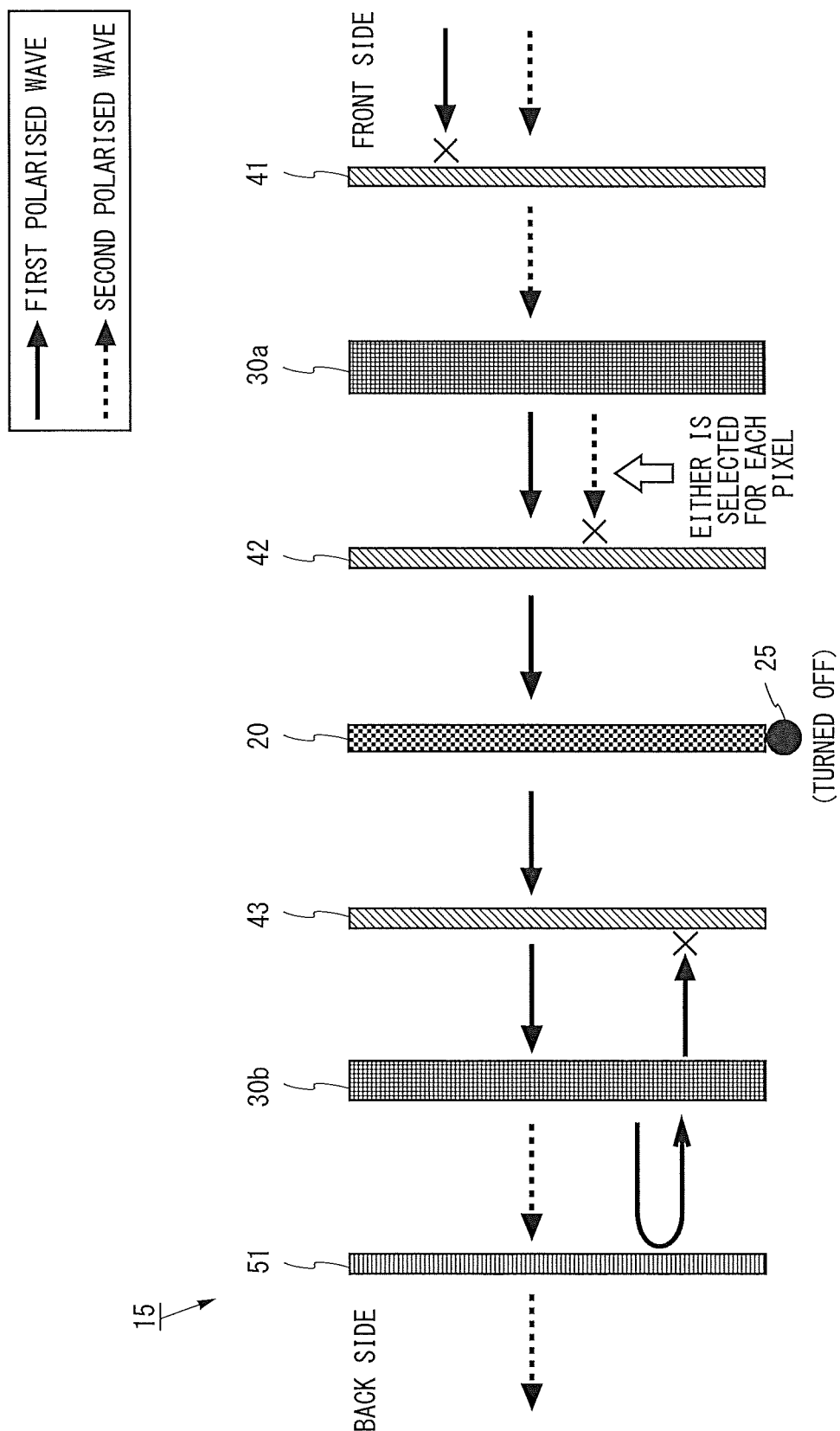
FIG. 11 is a diagram illustrating light trajectories in the display of the liquid crystal display device shown in FIG. 6 where light incident from the front side is transmitted to the back side.

FIG. 11 is a diagram illustrating light trajectories along which light incident from the front side is transmitted to the back side in the display 15. In the case shown in FIG. 11, as in the case shown in FIG. 10, the second liquid crystal panel 30b has ON-state and OFF-state pixels, and the light source 25 is turned off. A first polarized wave incident from the front side is absorbed by the first absorptive polarizing plate 41, and a second polarized wave is transmitted through the first absorptive polarizing plate 41 and strikes the first liquid crystal panel 30a.

The second polarized wave incident on the ON-state pixels of the first liquid crystal panel 30a is transmitted through the first liquid crystal panel 30a without conversion and absorbed by the second absorptive polarizing plate 42. On the other hand, the second polarized wave incident on the OFF-state pixels is converted into a first polarized wave, which strikes the second liquid crystal panel 30b after being transmitted sequentially through the second absorptive polarizing plate 42, the light guide plate 20, and the third absorptive polarizing plate 43. The first polarized wave that is incident on the OFF-state pixels of the second liquid crystal panel 30b is converted into a second polarized wave, which exits the second liquid crystal panel 30b and strikes the reflective polarizing plate 51. The first polarized wave that is incident on the ON-state pixels is transmitted without conversion and strikes the reflective polarizing plate 51. The first polarized wave is reflected by the reflective polarizing plate 51 and absorbed by the third absorptive polarizing plate 43. On the other hand, the second polarized wave incident on the reflective polarizing plate 51 is transmitted through the reflective polarizing plate 51 to the back side. Accordingly, the viewer on the back side can see the front side in places corresponding to the OFF-state pixels of the second liquid crystal panel 30b and also the screen that appears to be displayed in black in places corresponding to the ON-state pixels.

In this manner, it can be appreciated from the light trajectories shown in FIGS. 10 and 11 that the display 15 can also be used as a see-through display in which light incident from the back side is transmitted to the front side and light incident from the front side is transmitted to the back side. Note that similar to the above, displays in embodiments to be described below can also be used as see-through displays, but such descriptions will be omitted.

<2.6 Effects>

In the present embodiment, the second liquid crystal panel 30b is driven in accordance with the gradation value of an image displayed on the first liquid crystal panel 30a. In this case, luminance for the gradation value 0 is the same as in the first basic study, but luminance for the high gradation value is higher than in the second basic study. Accordingly, higher absolute values can be achieved for the quantity and the luminance of light illuminating the first liquid crystal panel 30a, resulting in an enhanced contrast ratio of an image displayed on the first liquid crystal panel 30a and enhanced display quality of the displayed image. Thus, image display quality can be enhanced not only for video display but also for still image display.

3. Second Embodiment

<3.1 Configuration and Operation of the Liquid Crystal Display Device>

Figure 12:
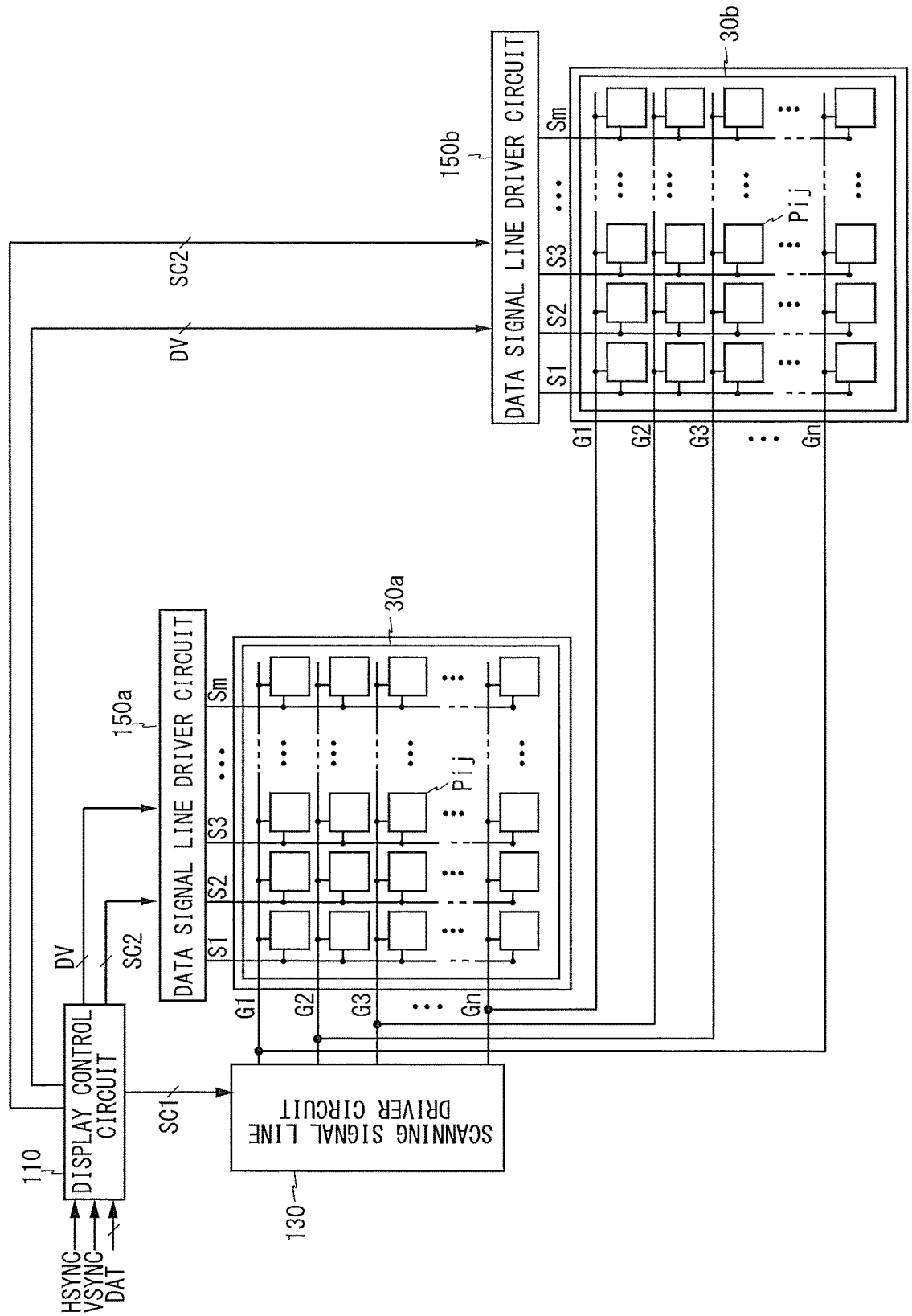
FIG. 12 is a block diagram illustrating the configuration of a liquid crystal display device according to a second embodiment of the present invention.

FIG. 12 is a block diagram illustrating the configuration of a liquid crystal display device according to a second embodiment of the present invention. The liquid crystal display device according to the present embodiment is an active-matrix display device including a first liquid crystal panel 30a, a second liquid crystal panel 30b, a display control circuit 110, a scanning signal line driver circuit 130, a first data signal line driver circuit 150a, and a second data signal line driver circuit 150b, as shown in FIG. 12. The first data signal line driver circuit 150a generates a drive image signal on the basis of a digital image signal DV provided by the display control circuit 110, and outputs the generated signal to the first liquid crystal panel 30a. The second data signal line driver circuit 150b generates a luminance adjustment image signal to be described later, on the basis of the digital image signal DV provided by the display control circuit 110, and provides the generated signal to the second liquid crystal panel 30b.

It should be noted that the configurations of the first liquid crystal panel 30a, the second liquid crystal panel 30b, the display control circuit 110, and the scanning signal line driver circuit 130 are the same as in the first embodiment and therefore will not be elaborated upon. Moreover, a display in the present embodiment is provided with the same elements as in the first embodiment shown in FIG. 6, including the first liquid crystal panel 30a, the second liquid crystal panel 30b, the light guide plate 20, the light source 25 attached to the light guide plate 20, and various polarizing plates disposed on surfaces of the first and second liquid crystal panels 30a and 30b. Therefore, any cross-sectional view and description of the display in the present embodiment will be omitted.

The liquid crystal display device according to the present embodiment employs a field-sequential mode in which red, green, and blue LEDs included in the light source 25 are sequentially lit up in a time division manner for respective subfield periods. Accordingly, unlike in the first embodiment, each pixel of the first liquid crystal panel 30a has no color filter formed thereon and is sequentially provided with red, green, and blue drive image signals in accordance with the timing of red, green, and blue illumination emitted by the light source 25 in a time division manner, and the second liquid crystal panel 30b is provided with a luminance adjustment image signal generated in a manner as will be described later. Note that the display configuration in the present embodiment is the same as in the first embodiment, and therefore, any cross-sectional view and description illustrating the display configuration will be omitted.

<3.2 Configuration and Operation of the Second Data Signal Line Driver Circuit>

As will be described later, the luminance adjustment image signal to be written in the second liquid crystal panel 30b is an image signal for a color whose gradation value is the highest among the red, green, and blue image signals that are sequentially written in each pixel of the first liquid crystal panel 30a during respective subfield periods in which red, green, and blue light are lit up. Such a luminance adjustment image signal is written in the second liquid crystal panel 30b for one whole field period. Accordingly, the second data signal line driver circuit 150b connected to the data signal lines $S_1$ to $S_m$ of the second liquid crystal panel 30b is configured differently from the first data signal line driver circuit 150a connected to the data signal lines $S_1$ to $S_m$ of the second liquid crystal panel 30a.

Figure 13:
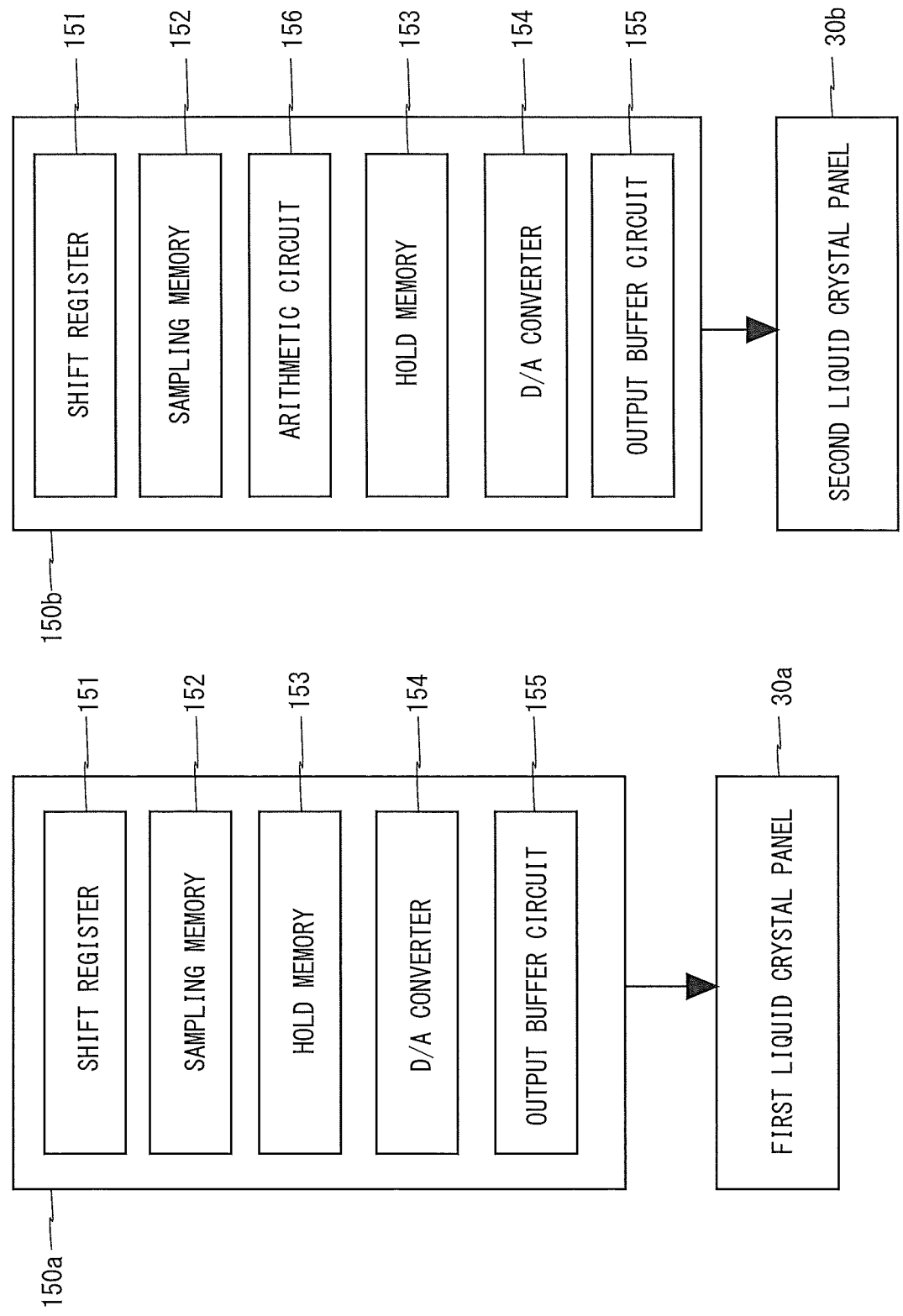
FIG. 13 is a block diagram illustrating the configurations of first and second data signal line driver circuits of the liquid crystal display device shown in FIG. 12.

Accordingly, the configuration and the operation of the second data signal line driver circuit 150b will be described. FIG. 13 is a block diagram illustrating the configurations of the first and second data signal line driver circuits 150a and 150b. As shown in FIG. 13, the second data signal line driver circuit 150b includes a shift register 151, sampling memory 152, hold memory 153, a D/A converter 154, and an output buffer circuit 155, as does the first data signal line driver circuit 150a, and further includes an arithmetic circuit 156 between the sampling memory 152 and the hold memory 153.

In the second data signal line driver circuit 150b, the shift register 151 transfers pulses sequentially from input to output terminals in accordance with a clock signal included in a control signal SC2 provided by the display control circuit 110, whereby the pulses are outputted to the sampling memory 152. In response to the pulses provided by the shift register 151, the sampling memory 152 samples and latches digital image signals provided by the display control circuit 110 and outputs the digital image signals to the arithmetic circuit 156.

The arithmetic circuit 156 calculates gradation values of red, green, and blue image signals for one field, on the basis of the image signals memorized in the sampling memory 152.

Then, an image signal having the highest of the calculated gradation values is obtained and outputted to the hold memory 153. The hold memory 153 has memorized therein image data for one horizontal line, and outputs a memorized image signal to the D/A converter 154 upon reception of a latch strobe signal included in the control signal SC2 from the display control circuit 110. While the hold memory 153 is outputting the image signal, the sampling memory 152 sequentially memorizes image signals for the next horizontal line. The D/A converter 154 converts the image signals sequentially provided by the hold memory 153 into luminance adjustment image signals, which are analog signals and outputted to the output buffer circuit 155. The output buffer circuit 155 provides the luminance adjustment image signals to the data signal lines S1 to Sm of the second liquid crystal panel 30b. In this manner, the second data signal line driver circuit 150b obtains the image signals for the highest gradation value by means of the arithmetic circuit 156 and also the luminance adjustment image signals on the basis of the image signals for the highest gradation value, and provides the obtained luminance adjustment image signals to the data signal lines S1 to Sm.

In this manner, the second data signal line driver circuit 150b outputs the luminance adjustment image signals that correspond to the highest of the gradation values for the red, green, and blue image data, to the data signal lines $S_1$ to $S_m$ of the second liquid crystal panel 30b for each field period, i.e., over all subfield periods included in each field period.

It should be noted that the configurations of the scanning signal line driver circuit 130 and the first data signal line driver circuit 150a in the present embodiment are the same as those of known scanning signal line driver circuits and data signal line driver circuits for use in field-sequential modes, and therefore, any descriptions thereof will be omitted.

Next, the operation of the second data signal line driver circuit 150b will be described for each field. FIG. 14 provides diagrams showing the relationship between lighting statuses of the light source and images displayed on the first and second liquid crystal panels 30a and 30b in the present embodiment; more specifically, FIG. 14(A) is a diagram showing ON/OFF states of the red, green, and blue LEDs during first through third subfield periods, FIG. 14(B) is a diagram showing a gradation value represented by a drive image signal provided to the first liquid crystal panel 30a, for each subfield period, and FIG. 14(C) is a diagram showing a gradation value represented by a luminance adjustment image signal provided to the second liquid crystal panel 30b, for each subfield period.

The red, green, and blue LEDs are sequentially lit up during the first, second, and third subfield periods, respectively, within one field period, as shown in FIG. 14(A). Gradation values for images displayed on the first liquid crystal panel 30a are, for example, in the sequence: 128, 90, and 128, during the first, second, and third subfield periods, respectively, as shown in FIG. 14(B). In this case, the highest of these gradation values is 128. Accordingly, each pixel of the second liquid crystal panel 30b is provided with a luminance adjustment image signal for the gradation value 128 over the entire field period, as shown in FIG. 14(C).

Accordingly, the second liquid crystal panel 30b is provided with the luminance adjustment image signal for the gradation value 128 during all of the first through third subfield periods within the field period. In this case, the first liquid crystal panel 30a is sequentially provided with drive image signals for displaying a red image with the gradation value 128, a green image with the gradation value 90, and a blue image with the gradation value 128, during the first, second, and third subfield periods, respectively.

<3.3 Effects>

The present embodiment renders it possible to achieve effects similar to those achieved by the first embodiment. Moreover, even when the first liquid crystal panel 30a is driven at high speed in a field-sequential mode, the second liquid crystal panel 30b can adequately follow the operation speed of the first liquid crystal panel 30a. Thus, it is possible to increase the quantity of light transmitted to the front side and thereby enhance the luminance of a display image.

<3.4 Variant>

Figure 15:
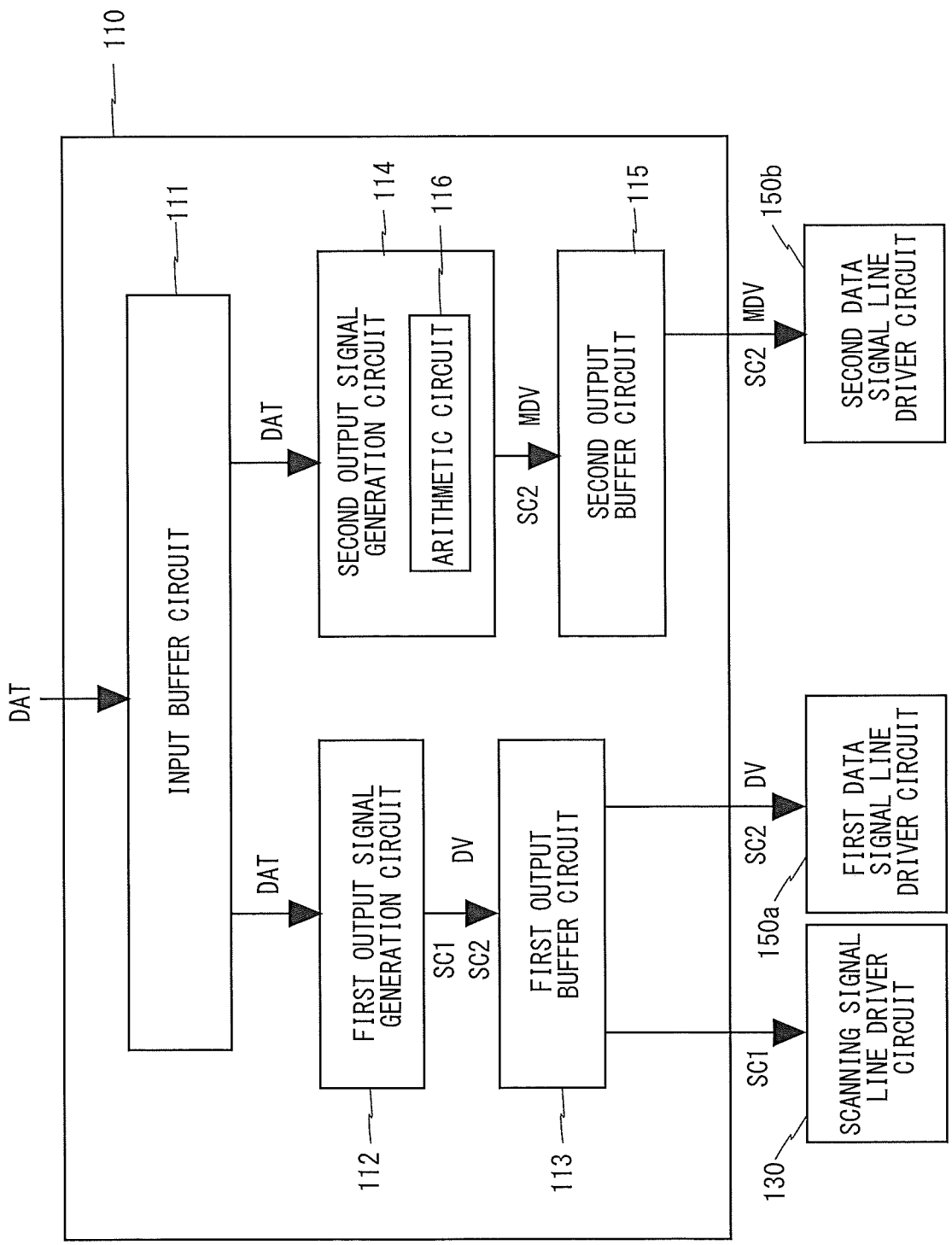
FIG. 15 is a block diagram illustrating the configuration of a display control circuit provided in a liquid crystal display device according to a variant of the second embodiment.

FIG. 15 is a block diagram illustrating the configuration of a display control circuit 110 provided in a liquid crystal display device according to a variant of the present embodiment. As shown in FIG. 15, the display control circuit 110 includes an input buffer circuit 111, a first output signal generation circuit 112, a first output buffer circuit 113, a second output signal generation circuit 114, and a second output buffer circuit 115, and further, the second output signal generation circuit 114 includes an arithmetic circuit 116.

When the input buffer circuit 111 is externally provided with image data DAT, the input buffer circuit 111 provides the image data to the first output signal generation circuit 112 and the second output signal generation circuit 114. On the basis of the image data DAT, the first output signal generation circuit 112 generates a digital image signal DV and control signals SC1 and SC2 for controlling the scanning signal line driver circuit 130 and the first data signal line driver circuit 150a, respectively, and outputs the control signal SC1 to the scanning signal line driver circuit 130 via the first output buffer circuit 113 and the digital image signal DV and the control signal SC2 to the first data signal line driver circuit 150a also via the first output buffer circuit 113.

The second output signal generation circuit 114 produces a control signal SC2 for controlling the second data signal line driver circuit 150b. Moreover, the arithmetic circuit 116 included in the second output signal generation circuit 114 calculates gradation values for red, green, and blue image signals for one field, and produces an image signal (hereinafter, referred to as a "highest gradation image signal") MDV having the highest of the calculated gradation values. The second output signal generation circuit 114 outputs the highest gradation image signal MDV and the control signal SC2 to the second data signal line driver circuit 150*b*. In this manner, the display control circuit 110 can obtain the highest gradation image signal by means of the arithmetic circuit 116.

The first data signal line driver circuit 150*a* generates a drive image signal on the basis of the digital image signal DV and provides the drive image signal to the first liquid crystal panel 30*a*. The second data signal line driver circuit 150*b* generates a luminance adjustment image signal on the basis of the highest gradation image signal MDV and provides the luminance adjustment image signal to the second liquid crystal panel 30*b*.

It should be noted that the liquid crystal display device according to this variant achieves the same effects as those achieved by the liquid crystal display device according to the present embodiment, and therefore, any descriptions of the effects will be omitted.

4. Third Embodiment

<4.1 Configuration of the Liquid Crystal Display Device>

Figure 16:
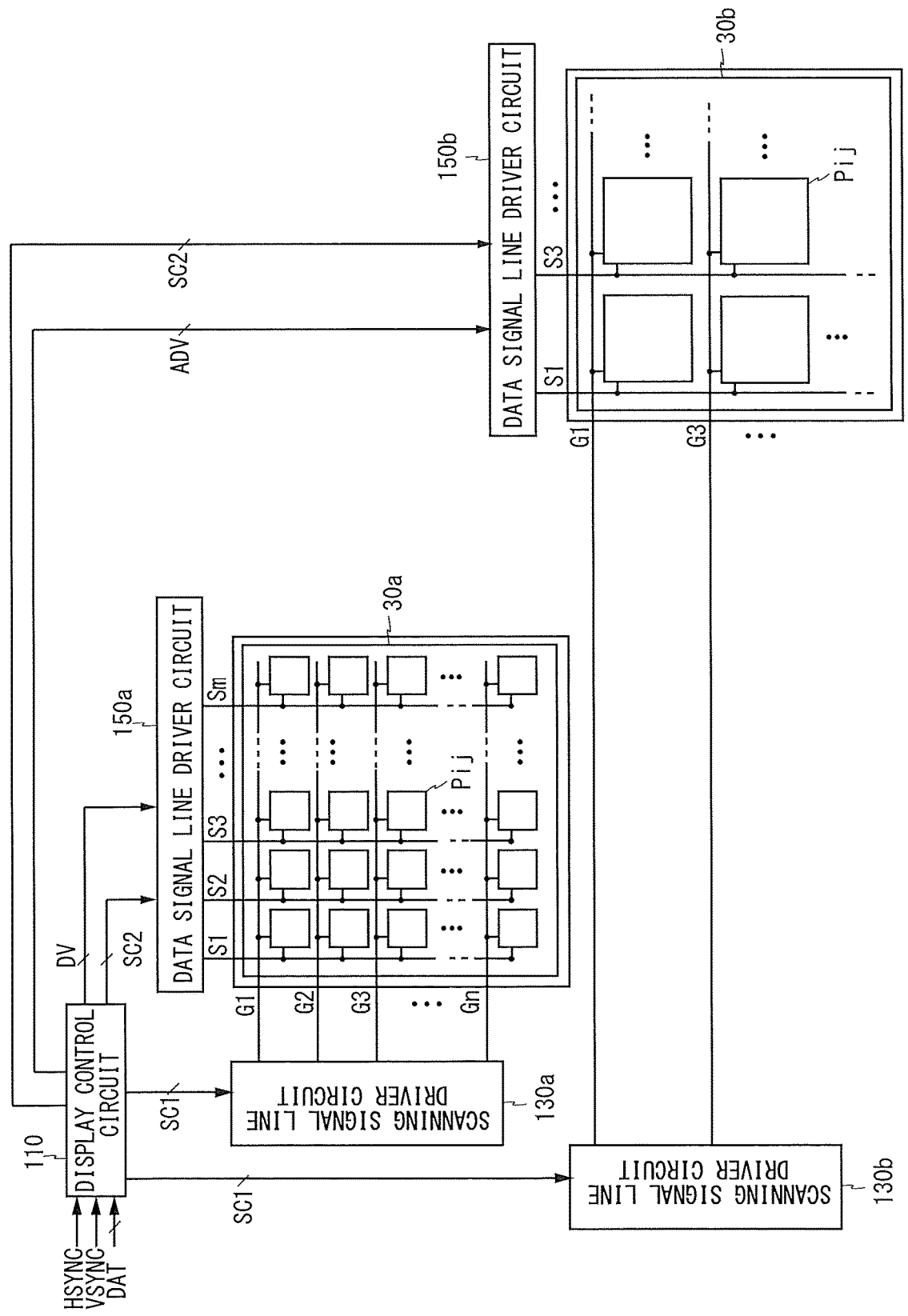
FIG. 16 is a block diagram illustrating the configuration of a liquid crystal display device according to a third embodiment of the present invention.

FIG. 16 is a block diagram illustrating the configuration of a liquid crystal display device according to a third embodiment of the present invention. The liquid crystal display device according to the present embodiment is an active-matrix display device including a first liquid crystal panel 30*a*, a second liquid crystal panel 30*b*, a display control circuit 110, a first scanning signal line driver circuit 130*a*, a second scanning signal line driver circuit 130*b*, a first data signal line driver circuit 150*a*, and a second data signal line driver circuit 150*b*, as shown in FIG. 16. In the present embodiment, as will be described later, the first liquid crystal panel 30*a* is driven by the first scanning signal line driver circuit 130*a* and the first data signal line driver circuit 150*a*, and the second liquid crystal panel 30*b* is driven by the second scanning signal line driver circuit 130*b* and the second data signal line driver circuit 150*b*.

The display configuration in the present embodiment is the same as in the first embodiment, and therefore, any cross-sectional view and description illustrating the display configuration will be omitted.

<4.2 Pixel Configuration>

Figure 17:
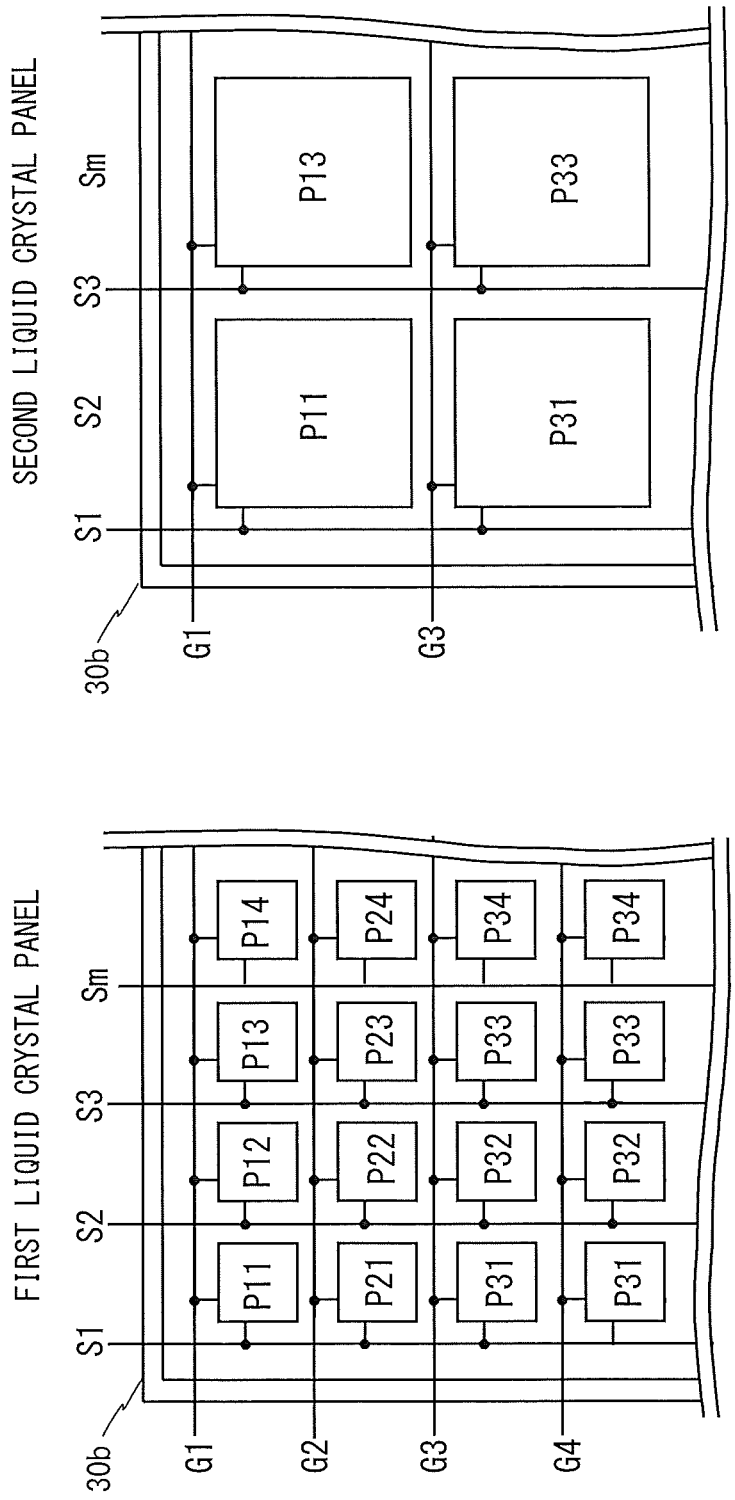
FIG. 17 provides enlarged views of portions of first and second liquid crystal panels in the liquid crystal display device shown in FIG. 16.

FIG. 17 provides enlarged views of portions of the first and second liquid crystal panels 30*a* and 30*b*. Each pixel formed on the second liquid crystal panel 30*b* is twice as large in dimension in each of the row and column directions as each pixel formed on the first liquid crystal panel 30*a*, and hence has four times as large an area, as shown in FIG. 17. In this case, for example, four pixels $P_{11}$, $P_{12}$, $P_{21}$, and $P_{22}$ of the first liquid crystal panel 30*a* correspond to one pixel $P_{11}$ of the second liquid crystal panel 30*b*. Accordingly, when the viewer sees the first liquid crystal panel 30*a* from the front side of the display, pixel frames that partition the pixels of the first liquid crystal panels 30*a* appear to lie exactly on pixel frames that partition the pixels of the second liquid crystal panel 30*b*. Therefore, an average gradation value for four pixels of the first liquid crystal panel 30*a* is calculated, and then, an image signal (hereinafter referred to as an "average gradation image signal") ADV corresponding to the average value is produced. Moreover, on the basis of the average gradation image signal ADV, a luminance adjustment image signal is produced and written in a pixel of the second liquid crystal panel 30*b* that corresponds to the pixels of the first liquid crystal panel 30*a* for which the average gradation value was calculated. In this manner, each pixel of the second liquid crystal panel 30*b* has a gradation value equal to an average gradation value for four corresponding pixels of the first liquid crystal panel 30*a*.

Furthermore, in each of the row and column directions, the number of pixels formed on the second liquid crystal panel 30*b* is half the number of pixels formed on the first liquid crystal panel 30*a*. Accordingly, scanning signal lines and data signal lines formed on the second liquid crystal panel 30*b* are simply required to be respectively one-half in number of the scanning signal lines $G_1$ to $G_n$ and the data signal lines $S_1$ to $S_m$ formed on the second liquid crystal panel 30*b* in the first embodiment. Therefore, the second liquid crystal panel 30*b* has formed thereon signal lines corresponding to odd-numbered lines of both the n scanning signal lines $G_1$ to $G_n$ and the m data signal lines $S_1$ to $S_m$ formed on the first liquid crystal panel 30*a*.

<4.3 Configurations and Operations of the Driver Circuits>

Figure 18:
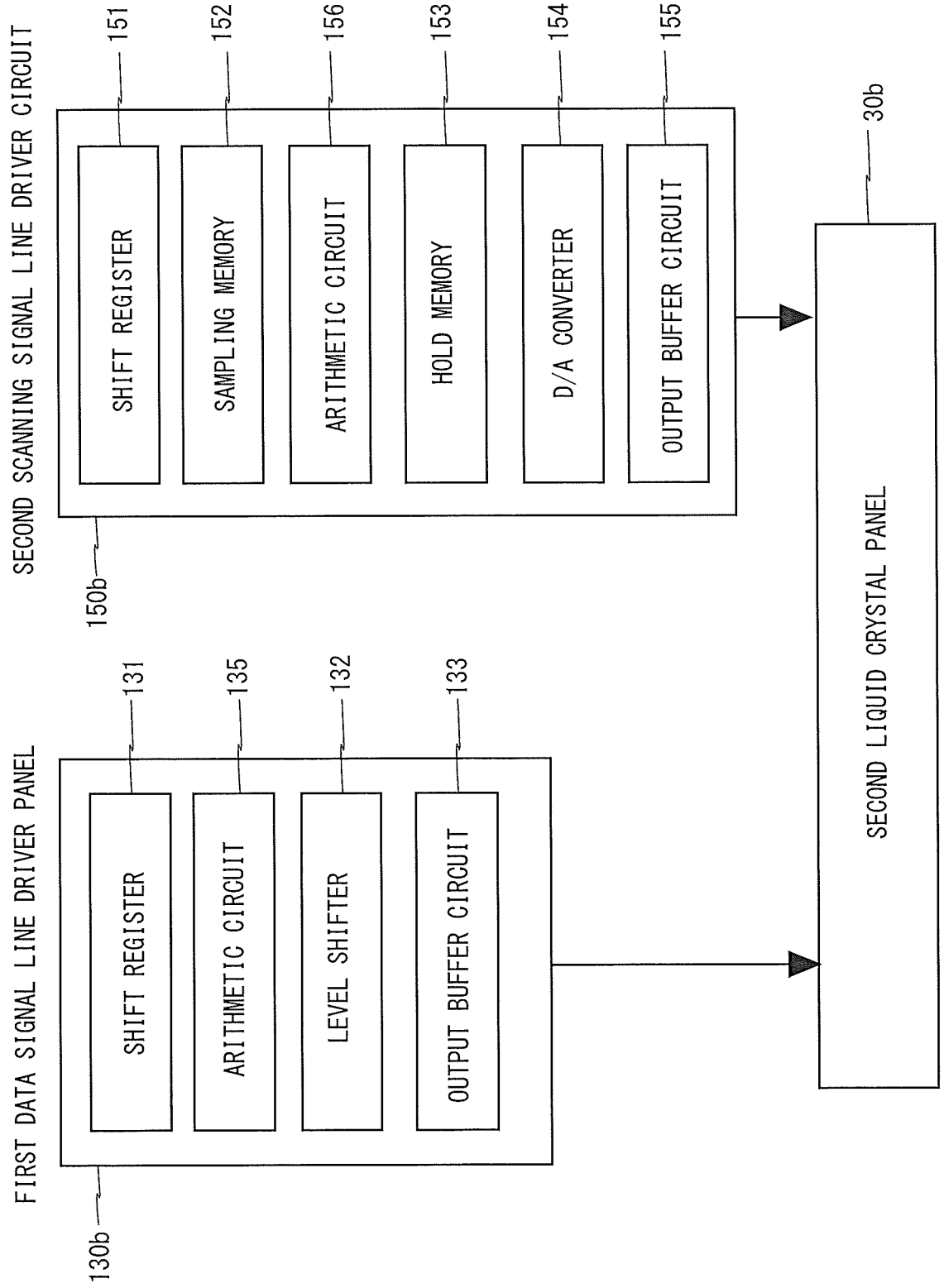
FIG. 18 is a block diagram illustrating the configurations of a second scanning signal line driver circuit and a second data signal line driver circuit in the liquid crystal display device shown in FIG. 16.

FIG. 18 is a block diagram illustrating the configurations of the second scanning signal line driver circuit 130*b* and the second data signal line driver circuit 150*b*. As shown in FIG. 18, the second scanning signal line driver circuit 130*b* includes a shift register 131, a level shifter 132, and an output buffer circuit 133, as included in known scanning signal line driver circuits, and further includes an arithmetic circuit 135 between the shift register 131 and the level shifter 132. The arithmetic circuit 135 generates scanning signals for sequentially activating and selecting scanning signal lines of the second liquid crystal panel 30*b*, and sequentially provides the generated scanning signals to odd-numbered lines of the scanning signal lines $G_1$ to $G_n$.

The configuration of the second data signal line driver circuit 150*b* is the same as that shown in FIG. 13, and therefore will not be elaborated upon. The second data signal line driver circuit 150*b* shown in FIG. 18 is also additionally provided with an arithmetic circuit 156 between the sampling memory 152 and the hold memory 153. The arithmetic circuit 156 calculates average gradation values for sets of four pixels of the first liquid crystal panel 30*a*, and then generates average gradation image signals ADV corresponding to the average gradation values. The D/A converter 154 is provided with the average gradation image signals ADV on the basis of which luminance adjustment image signals are produced and simultaneously outputted to the data signal lines $S_1$ to $S_m$ of the second liquid crystal panel 30*b*. As a result, each pixel of the second liquid crystal panel 30*b* is provided with a luminance adjustment image signal that represents an average gradation value for four corresponding pixels of the first liquid crystal panel 30*a*.

In the present embodiment, the pixel of the second liquid crystal panel 30*b* has been described as being twice as large in dimension in each of the row and column directions as the pixel of the first liquid crystal panel 30*a*. However, this is not limiting, and each dimension may be an integer multiple, such as three or four times, so long as the numbers of pixels of the first liquid crystal panel 30*a* in the vertical and horizontal directions are divisible by the respective numbers of pixels of the second liquid crystal panel 30*b* in the vertical and horizontal directions. As a result, when the first liquid crystal panel 30*a* is viewed from the front side of the display, pixel frames that partition the pixels of the first liquid crystal panel 30*a* appear to lie exactly on pixel frames that partition the pixels of the second liquid crystal panel 30*b*. Accordingly, light emitted by the second liquid crystal panel 30*b* illuminates the first liquid crystal panel 30*a* without being blocked by the pixel frames of the first liquid crystal panel 30*a*, with the result that the first liquid crystal panel 30*a* can efficiently utilize the illumination.

<4.4 Effects>

The present embodiment renders it possible to achieve effects similar to those achieved by the first embodiment. Moreover, each pixel of the second liquid crystal panel 30b has four times as large an area as each pixel of the first liquid crystal panel 30a, resulting in a reduced proportion of a switching element provided in each pixel. Accordingly, the pixel of the second liquid crystal panel 30b correspondingly increases in transmittance, and therefore, the quantity of light transmitted through the second liquid crystal panel 30b increases. Thus, the quantity of light illuminating the first liquid crystal panel 30a at the high gradation value increases, resulting in an enhanced display image luminance.

<4.5 Variant>

In the embodiment, the arithmetic circuit 135 provided in the second scanning signal line driver circuit 130b produces scanning signals for sequentially activating the scanning signal lines, and the arithmetic circuit 156 provided in the second data signal line driver circuit 150b produces luminance adjustment image signals on the basis of average gradation image signals ADV representing average gradation values for sets of four pixels.

Figure 19:
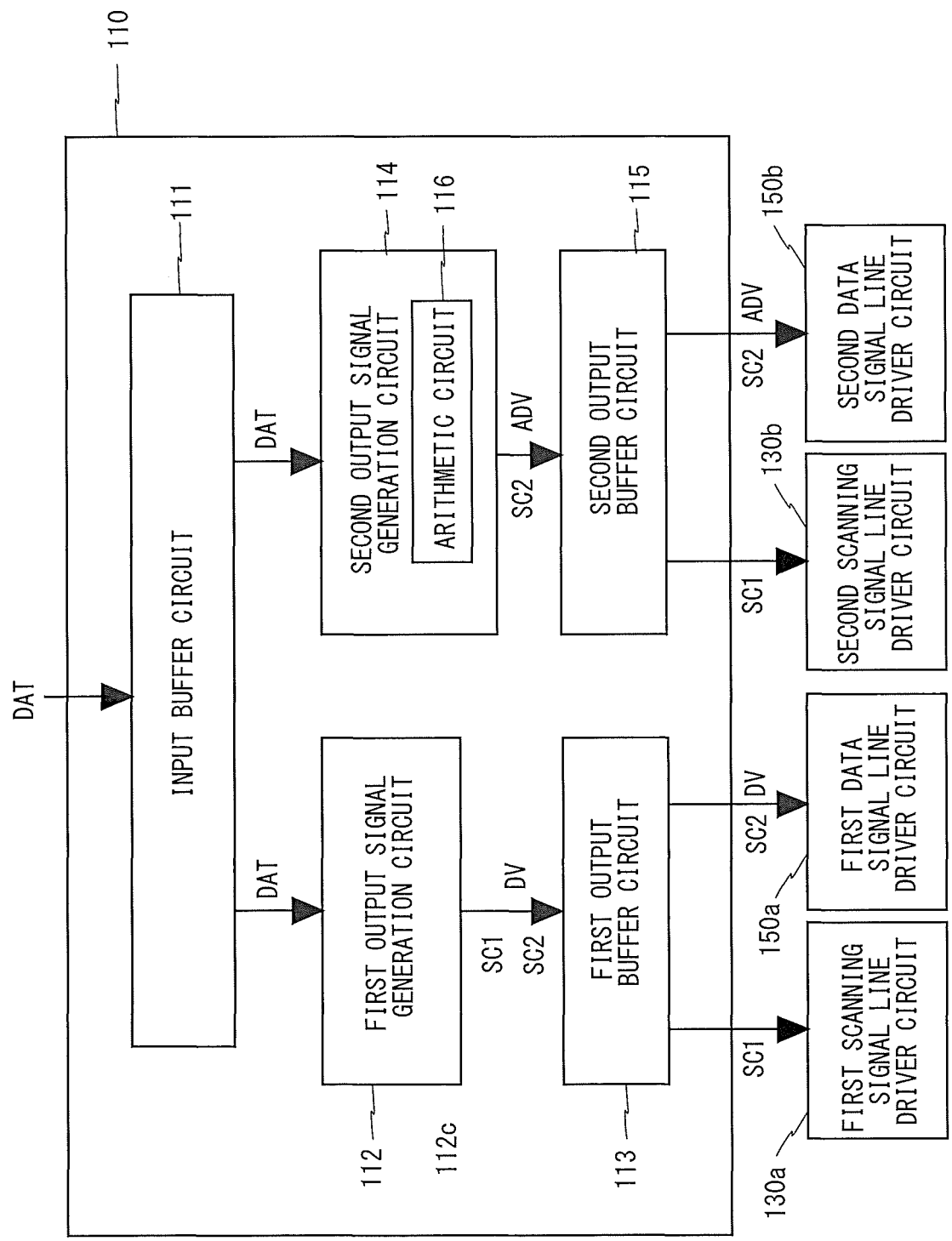
FIG. 19 is a block diagram illustrating the configuration of a display control circuit in a liquid crystal display device according to a variant of the third variant.

However, the arithmetic circuits 135 and 156 may be provided in the display control circuit 110. FIG. 19 is a block diagram illustrating the configuration of the display control circuit 110 in the present variant. As in the case shown in FIG. 15, the input buffer circuit 111, the first output signal generation circuit 112, the first output buffer circuit 113, the second output signal generation circuit 114, and the second output buffer circuit 115 are provided, and further, the second output signal generation circuit 114 includes the arithmetic circuit 116.

The arithmetic circuit 116 produces average gradation image signals ADV representing average gradation values for sets of four pixels of the first liquid crystal panel 30a, each set corresponding to one pixel of the second liquid crystal panel 30b, and the produced average gradation image signals ADV, along with a control signal SC2, are provided to the second data signal line driver circuit 150b. Moreover, a control signal SC1 is generated and provided to the second scanning signal line driver circuit 130b. As a result, the pixels of the second liquid crystal panel 30b are provided with the average gradation image signals ADV representing the average gradation values for the sets of four pixels of the first liquid crystal panel.

It should be noted that the first output signal generation circuit 112 generates the control signal SC1 provided to the first scanning signal line driver circuit 130a of the first liquid crystal panel 30a and also generates the control signal SC2 and the digital image signal DV, which are provided to the first data signal line driver circuit 150a. Such operations are the same as in the case shown in FIG. 15, and therefore, any descriptions thereof will be omitted. Also, the liquid crystal display device according to this variant achieves the same effects as in the present embodiment, and therefore, any description thereof will be omitted.

5. Fourth Embodiment

<5.1 Configuration and Operation of the Liquid Crystal Display Device>

Figure 20:
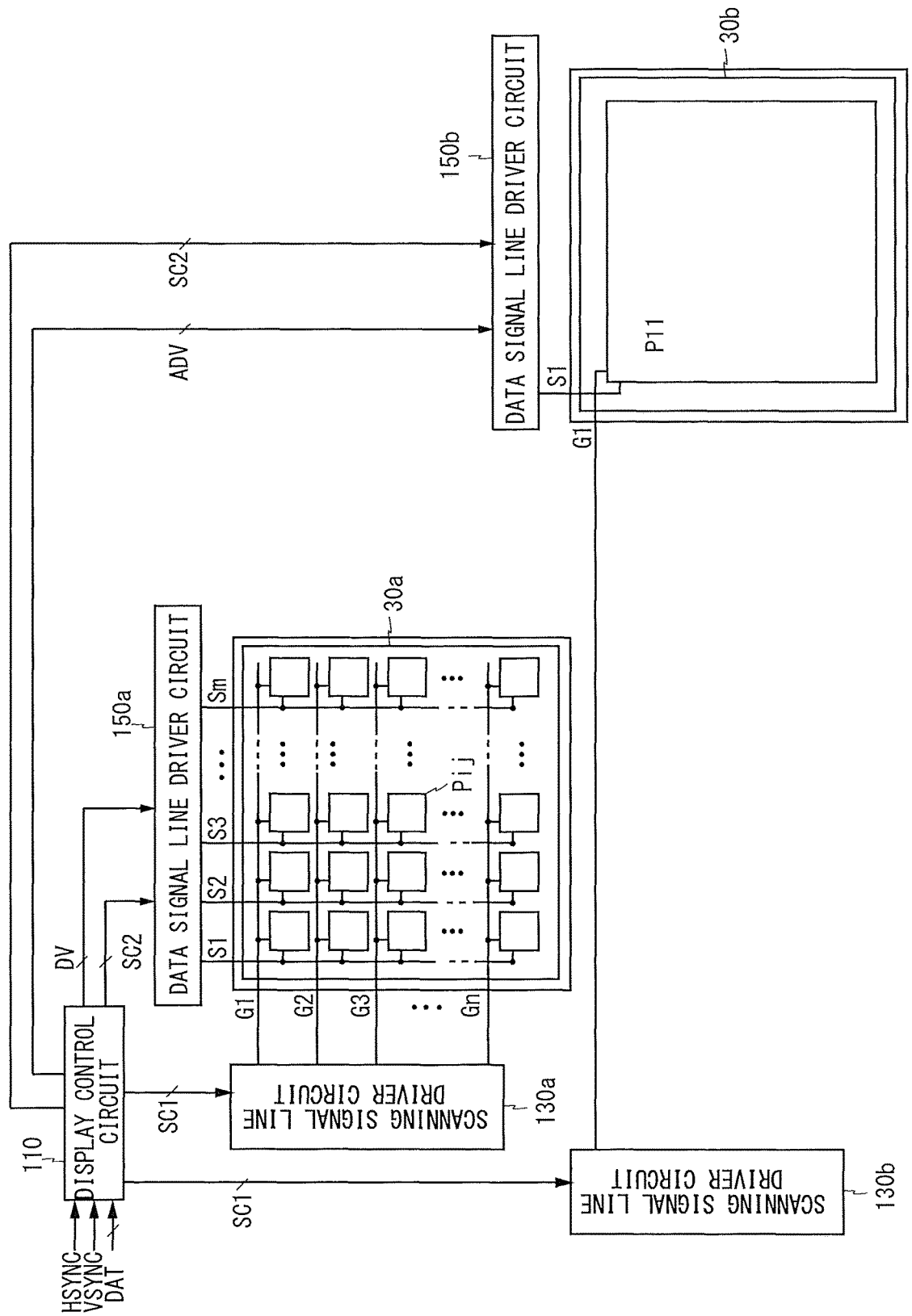
FIG. 20 is a block diagram illustrating the configuration of a liquid crystal display device according to a fourth embodiment of the present invention.

FIG. 20 is a block diagram illustrating the configuration of a liquid crystal display device according to a fourth embodiment of the present invention. The liquid crystal display device according to the present embodiment is an active-matrix display device including a first liquid crystal panel 30a, a second liquid crystal panel 30b, a display control circuit 110, a first scanning signal line driver circuit 130a, a second scanning signal line driver circuit 130b, a first data signal line driver circuit 150a, and a second data signal line driver circuit 150b, as shown in FIG. 20. In the present embodiment, as will be described later, the first liquid crystal panel 30a is driven by the first scanning signal line driver circuit 130a and the first data signal line driver circuit 150a, and the second liquid crystal panel 30b is driven by the second scanning signal line driver circuit 130b and the second data signal line driver circuit 150b.

The configuration of the liquid crystal display device according to the present embodiment is similar to the configuration of the liquid crystal display device according to the third embodiment shown in FIG. 16. However, the present embodiment differs from the liquid crystal display device shown in FIG. 16 in that the second liquid crystal panel 30b has formed thereon only one pixel $P_{11}$ having the same size as the total size of the (m×n) pixels $P_{ij}$ formed on the first liquid crystal panel 30a. Accordingly, when the viewer sees the first liquid crystal panel 30a from the front side of the display, the area of the first liquid crystal panel 30a in which the pixels $P_{ij}$ are formed appear to lie on a frame of the pixel $P_{11}$ on the second liquid crystal panel 30b.

In such a liquid crystal display device, for example, when an average of gradation values (average gradation value) for an image displayed by all of the (n×m) pixels $P_{ij}$ of the first liquid crystal panel 30a is 0, the second liquid crystal panel 30b is driven such that the gradation value for the pixel $P_{11}$ of the second liquid crystal panel 30b is also 0. Moreover, when the average gradation value for an image displayed by all the pixels of the first liquid crystal panel 30a is 128, the second liquid crystal panel 30b is driven such that the gradation value for the pixel $P_{11}$ of the second liquid crystal panel 30b is also 128. When the average gradation value for an image displayed by all the pixels of the first liquid crystal panel 30a is 255, the second liquid crystal panel 30b is driven such that the gradation value for the pixel $P_{11}$ of the second liquid crystal panel 30b is also 255.

<5.2 Configurations and Operations of the Driver Circuits>

Next, the display control circuit 110 in the present embodiment will be described. The configuration of the display control circuit 110 in the present embodiment is the same as the configuration of the display control circuit 110 in the third embodiment shown in FIG. 19. Therefore, differences between the display control circuit 110 in the present embodiment and the display control circuit 110 in the third embodiment will be described with reference to FIG. 19. The arithmetic circuit 116 provided in the second output signal generation circuit 114 in the present embodiment calculates an average gradation value for all pixels during one frame period, on the basis of image data DAT for one frame provided by the input buffer circuit 111, and produces an average gradation image signal ADV corresponding to the calculated average gradation value. Then, the average gradation image signal ADV, along with a control signal SC2, is outputted to the second data signal line driver circuit 150b via the second output buffer circuit 115, which also outputs a control signal SC1 to the second scanning signal line driver circuit 130b. The second data signal line driver circuit 150b produces a luminance adjustment image signal in accordance with the average gradation image signal ADV and the control signal SC2, and provides the produced luminance adjustment image signal to the data signal line $S_1$ of the second liquid crystal panel 30b.

Furthermore, in accordance with the control signal SC2, the second scanning signal line driver circuit 130b generates a scanning signal for activating the scanning signal line $G_1$ and continuously provides the scanning signal to the scanning signal line $G_1$ for one frame period. As a result, the luminance adjustment image signal is written in the pixel $P_{ij}$ of the second liquid crystal panel 30b, thereby adjusting the quantity of light emitted by the pixel $P_{11}$ of the second liquid crystal panel 30b for one frame period. Thus, it is possible to adjust the quantity of light transmitted through the first liquid crystal panel 30a and thereby adjust the luminance of an image to be displayed.

The arithmetic circuit 116 has been described above as being provided in the second output signal generation circuit 114 of the display control circuit 110. However, as in other embodiments, the arithmetic circuit may be provided in the second data signal line driver circuit 150b.

In this manner, the luminance adjustment image signal representing the average luminance for all the pixels of the first liquid crystal panel 30a is written in the pixel $P_{11}$ of the second liquid crystal panel 30b. Accordingly, when the average gradation value for all the pixels of the first liquid crystal panel 30a is 255, the second liquid crystal panel 30b, which is a normally white panel, is set in ON state.

Accordingly, a first polarized wave emitted toward the back side by the light guide plate 20 is transmitted through the second liquid crystal panel 30b without experiencing polarization conversion and strikes the first liquid crystal panel 30a after being reflected by the reflective polarizing plate 51, as in the case shown in FIG. 4. Moreover, the first liquid crystal panel 30a converts the first polarized wave into a second polarized wave, which is transmitted to the front side. As a result, the light that is emitted toward the back side by the light guide plate 20 contributes to enhancing the luminance of an image displayed on the first liquid crystal panel 30a. Thus, the quantity of light transmitted to the front side doubles.

On the other hand, when the average gradation value for all the pixels of the first liquid crystal panel 30a is 0, the second liquid crystal panel 30b is set in OFF state. As a result, a first polarized wave emitted toward the back side by the light guide plate 20 is converted into a second polarized wave by the second liquid crystal panel 30b, and the second polarized wave is transmitted through the reflective polarizing plate 51 to the back side. Accordingly, the light emitted toward the back side by the light guide plate 20 does not contribute to enhancing the luminance of an image displayed on the first liquid crystal panel 30a.

As a result, assuming that luminances for the gradation values 0 and 255 in the first and second basic studies are respectively expressed as a and b, luminances for the gradation values 0 and 255 in the present embodiment can be respectively expressed as a and 2b. Accordingly, the contrast ratio of the liquid crystal display device in the present embodiment is expressed by the following equation (4):

$$2b:a=2b/a:1 \quad (4)$$

The contrast ratio obtained by equation (4) is twice as high as the contrast ratio obtained by equation (1). Thus, in the case where the liquid crystal display device according to the present embodiment displays a video, for example, when the gradation value is 0 for an immediately preceding frame and also 255 for the current frame, the viewer can see an image with a doubled contrast ratio.

Unlike the liquid crystal display devices according to the other embodiments, the liquid crystal display device according to the present embodiment has only one large pixel $P_{11}$ formed on the second liquid crystal panel 30b. Accordingly, the entire second liquid crystal panel 30b transmits or blocks light by which the first liquid crystal panel 30a is to be illuminated. Therefore, the contrast ratio of an image displayed on the first liquid crystal panel 30a cannot be enhanced. However, in the case where, for example, video images are displayed on the entire screen of the first liquid crystal panel 30a, when the gradation value changes from 0 to 255, the light transmitted through the second liquid crystal panel 30b to illuminate the first liquid crystal panel changes similarly. Therefore, the viewer can watch the video displayed on the first liquid crystal panel 30a with a doubled contrast ratio when the image luminance is doubled during the current frame compared to the immediately preceding frame. Moreover, for example, when the image gradation value changes from 50 to 200, unlike in the above extreme case, the video contrast ratio is not enhanced to two times, but still, the video contrast ratio can be enhanced to a certain level.

In this manner, while the contrast ratio is not increased for still images, the contrast ratio during video watching, which is referred to herein as the "video contrast ratio", can be enhanced by the liquid crystal display device according to the present embodiment. On the other hand, the contrast ratio that can be perceived for both still and video images being watched with any of the liquid crystal display devices according to the first through third embodiments is referred to herein simply as the "contrast ratio".

<5.3 Effects>

In the present embodiment, the pixel $P_{11}$ of the second liquid crystal panel 30b is driven with gradation representation by a luminance adjustment image signal representing an average luminance for all pixels of the first liquid crystal panel 30a for each frame period. Accordingly, in the case where the luminance adjustment image signal is intended for displaying an image with a high gradation value, light emitted toward the back side by the light source 25 is reflected by the reflective polarizing plate 51 and thereby transmitted to the front side, and therefore, the quantity of light transmitted to the front side doubles. On the other hand, in the case where the luminance adjustment image signal is intended for displaying an image with a low gradation value, light emitted toward the back side by the light source 25 is transmitted through the reflective polarizing plate 51, and therefore, the quantity of light transmitted to the front side is not increased. Thus, for example, in the case of a video being displayed on the first liquid crystal panel 30a such that the image gradation value changes from high to low, the video contrast ratio can be enhanced to up to two times.

6. Common Variant Among the Embodiments

Figure 21:
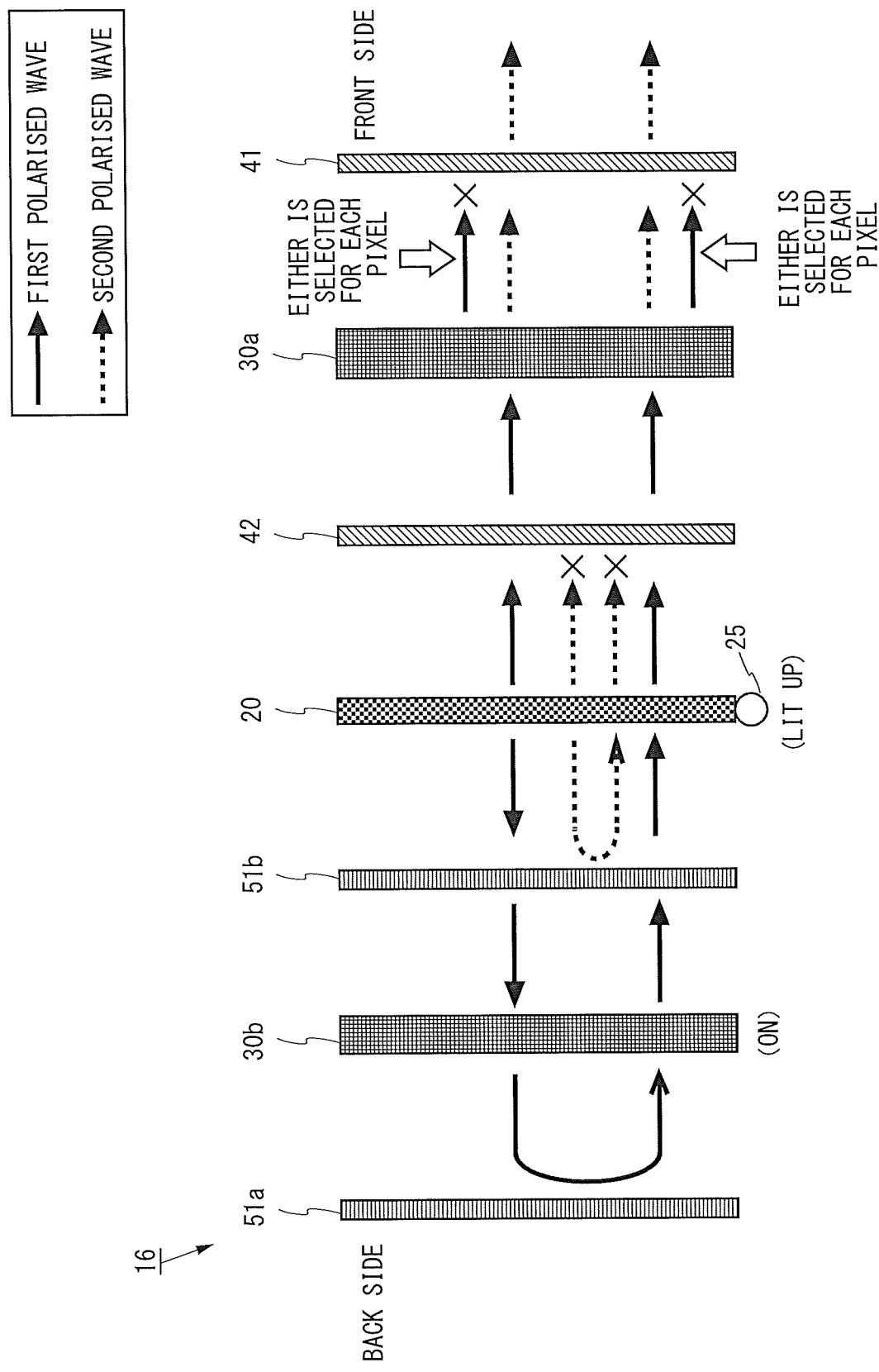
FIG. 21 is a cross-sectional view illustrating the configuration of a display of a liquid crystal display device according to a variant of the first through fourth embodiments, along with light trajectories.

The liquid crystal display device according to each embodiment has been described as having the display configuration shown in FIG. 3. However, a display 16 configured as shown in FIG. 21 may be employed. FIG. 21 is a cross-sectional view illustrating the configuration of the display 16 of a liquid crystal display device according to the present variant, along with light trajectories. The display 16 shown in FIG. 21 has a reflective polarizing plate disposed in place of the third absorptive polarizing plate 43 of the display 15 shown in FIG. 11. Since the display 16 requires two reflective polarizing plates, to distinguish these reflective polarizing plates, the same reflective polarizing plate as in the display 15 will be referred to as the first reflective polarizing plate 51a and the additionally provided reflective polarizing plate will be referred to as the second reflective polarizing plate 51b.

In this case, a second polarized wave emitted toward the back surface side by the light guide plate 20 is reflected toward the front side by the second reflective polarizing plate 51b. The reflected second polarized wave is transmitted through the light guide plate 20 and absorbed by the second absorptive polarizing plate upon incidence thereon. As a result, similar to the case of the display 15, the light that is transmitted to the front side of the display 16 includes a second polarized wave obtained by OFF-state pixels of the first liquid crystal panel 30a through conversion from a first polarized wave included in light emitted toward the front side by the light guide plate 20, and also includes another second polarized wave obtained by the first liquid crystal panel 30a through conversion from light emitted toward the back side by the light guide plate 20 and reflected by the first reflective polarizing plate 51a. Accordingly, the quantity of light transmitted through the display 16 to the front side is equal to the quantity of light transmitted through the display 15 to the front side. Thus, the first through fourth embodiments can achieve similar effects even when the display 15 is replaced by the display 16.

7. Other

In the embodiments, both the first and second liquid crystal panels 30a and 30b have been described as TN liquid crystal panels, but may be VA (vertical alignment) liquid crystal panels. Moreover, both the first and second liquid crystal panels 30a and 30b have been described as being normally white liquid crystal panels, but may be normally black liquid crystal panels.

Furthermore, the embodiments have been described with respect to the case where the contrast ratio is increased to up to two times. However, such an increase is determined by the quantity of light emitted toward the first liquid crystal panel, and therefore, it is understood that the contrast ratio is increased to up to more than two times as the quantity ratio increases.

It should be noted that the display panel including the first liquid crystal panel 30a is also referred to as the "first polarization modulation element", and the display panel including the second liquid crystal panel 30b is also referred to as the "second polarization modulation element".

This application claims priority to Japanese Patent Application No. 2017-005091, filed Jan. 16, 2017 and titled "DISPLAY DEVICE", the content of which is incorporated by reference herein.

DESCRIPTION OF THE REFERENCE CHARACTERS 15 display
20 light guide plate
25 light source
30a first liquid crystal panel (first polarization modulation element)
30b second liquid crystal panel (second polarization modulation element)
41 first absorptive polarizing plate
42 second absorptive polarizing plate
43 third absorptive polarizing plate (polarizing plate)
51 reflective polarizing plate
51a the first reflective polarizing plate
51b the second reflective polarizing plate
110 display control circuit
116 arithmetic circuit
130 scanning signal line driver circuit
130a first scanning signal line driver circuit
130b second scanning signal line driver circuit
135 arithmetic circuit
150 data signal line driver circuit
150a first data signal line driver circuit
150b second data signal line driver circuit
156 arithmetic circuit

The invention claimed is:

1. A display device with a display presenting an image based on externally provided image data and doubling as a see-through display, wherein,
the display includes:
a light source configured to emit light including a first polarized wave and a second polarized wave having a polarization axis perpendicular to a polarization axis of the first polarized wave;
a light guide plate configured to emit the light derived from the light source, toward front and back sides of the display;
a first polarization modulation element disposed on the front side relative to the light guide plate and having a plurality of pixels formed thereon;
absorptive polarizing plates respectively disposed on front-side and back-side surfaces of the first polarization modulation element;
a second polarization modulation element disposed on the back side relative to the light guide plate and having formed thereon a pixel or pixels whose number is equal to or less than the pixels of the first polarization modulation element;
a polarizing plate disposed on a front-side surface of the second polarization modulation element; and
a reflective polarizing plate disposed on a back-side surface of the second polarization modulation element, and
the second polarization modulation element is driven with gradation representation in accordance with a gradation value of an image displayed on the first polarization modulation element, so as to control a quantity of light with which the light source illuminates the first polarization modulation element,
wherein the second polarization modulation element has fewer pixels than the first polarization modulation element,
wherein the pixel of the second polarization modulation element has integer-multiple lengths in row and column directions compared to the pixel of the first polarization modulation element,
numbers of pixels of the first polarization modulation element in vertical and horizontal directions are respectively divisible by numbers of pixels of the second polarization modulation element in the vertical and horizontal directions,
pixel frames that partition the pixels of the first polarization modulation element and pixel frames that partition the pixels of the second polarization modulation element are formed so as to be positioned on each other when the first polarization modulation element and the second polarization modulation element are disposed in the display, and
the pixels of the second polarization modulation element are driven with gradation representation by luminance adjustment image signals generated based on average gradation image signals representing average gradation values for respectively corresponding sets of pixels of the first polarization modulation element.

2. The display device according to claim 1, further comprising:
 a scanning signal line driver circuit configured to generate scanning signals for selectively activating a plurality of scanning signal lines formed in the second polarization modulation element and to provide the scanning signals to the scanning signal lines;
 a data signal line driver circuit configured to generate the luminance adjustment image signal and provide the luminance adjustment image signal to a plurality of data signal lines formed in the second polarization modulation element; and
 a display control circuit configured to generate control signals for controlling operations of the scanning signal line driver circuit and the data signal line driver circuit and to provide the control signals respectively to the scanning signal line driver circuit and the data signal line driver circuit, wherein,
 the average gradation image signal is generated based on the image data by an arithmetic circuit provided in either the display control circuit or the data signal line driver circuit.

3. The display device according to claim 1, wherein the polarizing plate disposed on the front-side surface of the second polarization modulation element is an absorptive polarizing plate.

4. The display device according to claim 1, wherein the first polarization modulation element and the second polarization modulation element are liquid crystal panels.

5. The display device according to claim 4, wherein the first polarization modulation element and the second polarization modulation element are normally white liquid crystal panels.

6. The display device according to claim 4, wherein the liquid crystal panels are twisted nematic panels.

* * * * *